(12) United States Patent
Lugil et al.

(10) Patent No.: US 7,327,779 B1
(45) Date of Patent: Feb. 5, 2008

(54) METHOD AND APPARATUS FOR HIGH-SPEED SOFTWARE RECONFIGURABLE CODE DIVISION MULTIPLE ACCESS COMMUNICATION

(75) Inventors: Nico Lugil, Rotselaar (BE); Eric Borghs, Geel (BE); Sébastien Louveaux, Louvain-La-Neuve (BE); Carl Mertens, Brasschaat (BE); Lieven Philips, Aarschot (BE); Jurgen Vandermot, Leuven (BE); Jan Vanhoof, Wijgmaal (BE)

(73) Assignee: Agilent Technologies, Inc., Santa Clara, CA (US)

( * ) Notice: Subject to any disclaimer, the term of this patent is extended or adjusted under 35 U.S.C. 154(b) by 803 days.

(21) Appl. No.: 10/048,142

(22) PCT Filed: Jul. 19, 2000

(86) PCT No.: PCT/BE00/00086

§ 371 (c)(1),
(2), (4) Date: Jul. 16, 2002

(87) PCT Pub. No.: WO01/08314

PCT Pub. Date: Feb. 1, 2001

Related U.S. Application Data

(60) Provisional application No. 60/145,426, filed on Jul. 23, 1999.

(51) Int. Cl.
*H04B 1/707* (2006.01)

(52) U.S. Cl. .................................. 375/141

(58) Field of Classification Search ................ 375/130, 375/140, 141, 146, 147, 219
See application file for complete search history.

(56) References Cited

U.S. PATENT DOCUMENTS 4,291,409 A    9/1981    Weinberg et al.

(Continued)

FOREIGN PATENT DOCUMENTS

EP    0 511 139 A1    10/1992

(Continued)

OTHER PUBLICATIONS

Sirius Communications Press Releases, CDMAX: Sirius Announces World's First Software-Configurable W-CDMA Core for Third-Generation Wireless Handsets and Base Stations, Jun. 14, 1999, www.sirius.com.

(Continued)

*Primary Examiner*—Kevin Burd

(57) ABSTRACT

A communication device for W-CDMA signal transmission and reception includes a W-CDMA transmitter having at least one of a RAM and registers, a W-CDMA receiver having at least one of a RAM and registers, and a signal acquisition circuit. The communication device is software reconfigurable and further includes a digital circuit for phase unbalance precompensation in the W-CDMA transmitter. The digital circuit includes an input register holding a compensation angle and a section performing arithmetic calculations to acquire a change of an I, Q angle by the compensation angle. A method of operating a W-CDMA communication device includes the acts of configuring the device for a specific use, and performing at least one of transmitting, receiving and acquiring waveform signals. The configuring is preferably done by a processor.

42 Claims, 26 Drawing Sheets

U.S. PATENT DOCUMENTS

| | | |
|---|---|---|
| 4,761,778 A | 8/1988 | Hui |
| 4,817,146 A | 3/1989 | Szczutkowski et al. |
| 5,327,455 A | 7/1994 | De Gaudenzi et al. |
| 5,327,467 A | 7/1994 | De Gaudenzi et al. |
| 5,345,472 A | 9/1994 | Lee |
| 5,381,108 A * | 1/1995 | Whitmarsh et al. ............ 330/2 |
| 5,406,570 A | 4/1995 | Berrou et al. |
| 5,511,067 A | 4/1996 | Miller |
| 5,559,828 A | 9/1996 | Armstrong et al. |
| 5,606,575 A | 2/1997 | Williams |
| 5,675,609 A | 10/1997 | Johnson |
| 5,734,962 A | 3/1998 | Hladik et al. |
| 5,742,637 A | 4/1998 | Kanterakis et al. |
| 5,812,607 A | 9/1998 | Hutchinson et al. |
| 5,825,327 A | 10/1998 | Krasner |
| 5,872,810 A * | 2/1999 | Philips et al. ............ 375/222 |
| 5,903,611 A * | 5/1999 | Schnabl et al. ............ 375/297 |
| 5,950,127 A | 9/1999 | Nitta et al. |
| 5,982,807 A | 11/1999 | Snell |
| 5,995,537 A | 11/1999 | Kondo |
| 6,009,325 A | 12/1999 | Retzer et al. |
| 6,081,697 A * | 6/2000 | Haartsen .................... 455/109 |
| 6,097,974 A | 8/2000 | Camp, Jr. et al. |
| 6,108,317 A | 8/2000 | Jones et al. |
| 6,122,291 A | 9/2000 | Robinson et al. |
| 6,125,266 A | 9/2000 | Matero et al. |
| 6,141,373 A | 10/2000 | Scott |
| 6,208,292 B1 | 3/2001 | Sih et al. |
| 6,208,844 B1 | 3/2001 | Abdelgany |
| 6,219,341 B1 | 4/2001 | Varanasi |
| 6,252,917 B1 | 6/2001 | Freeman |
| 6,272,168 B1 | 8/2001 | Lomp et al. |
| 6,282,184 B1 | 8/2001 | Lehman et al. |
| 6,307,877 B1 | 10/2001 | Philips et al. |
| 6,317,422 B1 | 11/2001 | Khaleghi et al. |
| 6,324,159 B1 | 11/2001 | Mennekens et al. |
| 6,351,236 B1 | 2/2002 | Hasler |
| 6,359,940 B1 | 3/2002 | Ciccarelli et al. |
| 6,370,669 B1 | 4/2002 | Eroz et al. |
| 6,373,831 B1 | 4/2002 | Secord et al. |
| 6,400,314 B1 | 6/2002 | Krasner |
| 6,411,661 B1 | 6/2002 | Nguyen et al. |
| 6,480,529 B1 | 11/2002 | Sih et al. |
| 6,542,558 B1 | 4/2003 | Schulist et al. |
| 6,549,784 B1 | 4/2003 | Kostic et al. |
| 6,563,856 B1 | 5/2003 | O'Shea et al. |
| 6,580,921 B1 | 6/2003 | Inoue et al. |
| 6,597,727 B2 | 7/2003 | Philips et al. |
| 6,614,834 B1 | 9/2003 | Meng et al. |
| 6,748,010 B1 | 6/2004 | Butler et al. |
| 6,898,233 B2 | 5/2005 | Philips et al. |
| 2001/0003530 A1 | 6/2001 | Sriram et al. |
| 2002/0064142 A1 | 5/2002 | Antonio et al. |

FOREIGN PATENT DOCUMENTS

| | | |
|---|---|---|
| EP | 0 563 020 A2 | 9/1993 |
| EP | 0 767 544 | 4/1997 |
| EP | 0 820 159 A2 | 1/1998 |
| EP | 0 928 084 | 7/1999 |
| FR | 2 675 968 | 10/1992 |
| WO | WO 96/38993 | 12/1996 |
| WO | WO 97/14056 | 4/1997 |
| WO | WO 98/02758 | 1/1998 |

OTHER PUBLICATIONS

Berrou et al., *Near Shannon Liimit Error—Correcting Coding and Decoding: Turbo-Codes (1)*, Proceedings of the ICC93, Geneva, Switzerland, May 23-26, 1993.

Corazza et al., *Probability of Error in the Return Link of a CDMA Mobile Satellite System*, IEEE, pp. 1293-1297, 1996.

DaSilva, V. et al., *Performance of orthogonal CDMA codes for quasi-synchronous communication systems*, Aug. 1993, Universal Personal Communications, vol. 2, pp. 995-999.

De Gaudenzi et al., *Bandlimited Quasi-Synchronous CDMA: A Novel Satellite Access Technique for Mobile and Personal Communication Systems*, IEEE Journal on Selected Areas in Communication, vol. 10, No. 2, pp. 328-343, Feb. 1992.

De Gaudenzi, *Signal Recognition and Signature Code Acquisition in CDMA Mobile Packet Communications*, pp. 196-208, IEEE Transactions on Vehicular Technology, vol. 47, No. 1, 1998.

Esmailzadeh, R. et al., *Quasi-synchronous time division duplex CDMA*, 1994, IEEE GLOBCOM '94, vol. 3, pp. 1637-1641.

Ojanpera, *Wideband CDMA for Third Generation Mobile Communications*, Artech House Publishers, 1998, pp. 114-115.

Philips et al., *A Programmable CDMA IF Transceiver ASIC for Wireless Communications*, IEEE 1995 Custom Integrated Circuits Conference.

Van Wyk et al., *Performance Tradeoff Among Spreading, Coding and Multiple-Antenna Transmit Diversity for High Capacity Space-Time Coded DS/CDMA*, IEEE, 1999.

\* cited by examiner

METHOD AND APPARATUS FOR HIGH-SPEED SOFTWARE RECONFIGURABLE CODE DIVISION MULTIPLE ACCESS COMMUNICATION

CROSS-REFERENCE TO RELATED APPLICATIONS

This application is the U.S. National Phase of International Patent Application No. PCT/BE00/00086 filed on Jul. 19, 2000 under the Patent Cooperation Treaty (PCT), which was published by the International Bureau in English on Feb. 1, 2001 as WO 01/08314 A2, which designates the U.S. and is a non-provisional application of U.S. Provisional Patent Application No. 60/145,426, filed Jul. 23, 1999, each of which is incorporated by reference.

FIELD OF THE INVENTION

The present invention is related to a communication device for W-CDMA signals which is software reconfigurable. The present invention is further related to a method for operating said device.

SUMMARY OF CERTAIN INVENTIVE ASPECTS

The present invention aims to provide a W-CDMA apparatus which allows the implementation of various telecommunication standards, and various applications realisable according to these standards, without the need for a powerful DSP processor for the flexible part of the physical layer.

A further aim is to provide said apparatus for various fading channel circumstances.

Another aim is to provide said apparatus under the form of an Intellectual Property core.

DESCRIPTION OF THE RELATED TECHNOLOGY

A communication device, for example, for Wideband Code Division Multiple Access (W-CDMA) is configured to operate in accordance with a predetermined telecommunication standard and predetermined parameters. The communication device typically has a digital signal processor (DSP) that allows it to adapt to changes of the physical layer.

There is therefore a need for a W-CDMA system, which allows the implementation of various telecommunication standards, and various applications realizable according to these standards, without the need for a powerful DSP processor for the flexible part of the physical layer. Further, there is a need for a W-CDMA apparatus that provides for various fading channel circumstances.

The present invention concerns a communication device for W-CDMA signal transmission and reception, which is software configurable, comprising:
 a W-CDMA transmitter comprising RAM and/or registers;
 a W-CDMA receiver comprising RAM and/or registers; and
 signal acquisition means, characterised in that it further comprises a digital circuit for phase unbalance precompensation, said circuit comprising:
  an input register holding the compensation angle,
  means for performing arithmetic to acquire a change of the I,Q angle by the compensation angle.

According to a preferred embodiment of the present invention, said communication device further comprises a circuit for noise and interference estimation, said circuit comprising:
 means to acquire a programmable number of absolute value accumulations at chip rate or oversampled chip rate,
 a programmable low pass filter to average the noise and interference estimations.

According to a preferred embodiment of the present invention, said communication device further comprises a circuit for initial synchronization, said circuit comprising:
 a Matched Filter, energy calculation and accumulating RAM for slot synchronization,
 a set of correlators for frame synchronization & code group identification,
 an energy estimation block,
 Maximum detection means, readable by the microprocessor subsystem.

According to a preferred embodiment of the present invention, said communication device further comprises circuitry to generate packet data transmission, said circuitry comprising:
 A data and activity bits holding buffer,
 I,Q spreaders and gain control means,
 scrambling code generator and scrambling means,
 means for packet timing through RX frame edge triggering.

The present invention is equally related to the use of a communication device according to the present invention, for RACH transmission in UMTS/FDD.

Software reconfigurable means that parameters of a circuit and/or algorithmic alternatives for this circuit can be configured using software settings. The circuit itself is built up of logic, and contains memory (such as registers and/or RAM) which are preferably controlled by a processor subsystem, which performs the above mentioned software settings. Such an approach leads to lesser power consumption if compared to a complete software implementation, while there is still sufficient flexibility possible.

Said communication device can further comprise a processor. Such a processor can be any kind of processor capable of changing the settings of the device. Examples of such processors are DSP processors, microprocessors, microcontrollers, FPGA, logic circuits and FSM circuits.

The communication device is preferably characterised in that the processor is arranged to reconfigure the communication device.

Said processor preferably controls the RAM and/or registers of said W-CDMA signal transmitter and receiver.

The transmitter preferably comprises a first programmable pulse shaping filter and the receiver preferably comprises a second programmable pulse shaping filter which can be programmable to perform GMSK filtering while said transmitter and receiver are arranged to interface with a GSM front-end.

The processor can be arranged to perform the GSM protocol stack.

In a preferred embodiment, the communication device of the present invention is arranged for waveform transmission and/or reception and/or acquisition of signals selected from the group consisting of UMTS, Satellite UMTS, Galileo, GPS, IS-2000, IMT-2000, CDMA2000, IS-95, 3GPP, 3GPP2 and ARIB signals.

The transmitter of the device according to the present invention can comprise one or more elements selected from the group consisting of:

synchronisation hardware to slave transmit start epochs to events external to the transmitter;

a burst generator for realising discontinuous transmissions;

a QPN channel containing one or more spreaders with their own amplification of the output;

a combiner to accumulate the QPN channel output;

a PN code generator;

a scrambling code generator;

a scrambler;

a combiner which accumulates the scrambling code output;

a pulse shaping oversampling filter; and an NCO and upconverter for carrier precompensation.

The PN code generator can be realised as a RAM in which the PN codes are downloaded under control of the processor. The scrambling code generator can be realised as a programmable Gold Code generator. The QPN channel can be arranged to execute UMTS forward or return link transmission. The amplification of the spreader output is preferably arranged to perform transmit power control.

The transmitter of the device according to the present invention preferably comprises a time interpolator to perform sub-chip time alignments (e.g. for S-CDMA).

The transmitter of the device according to the present invention can be arranged for multi-code transmission.

The receiver of the communication device of the present invention can comprise:

A pulse shaping filter;

An optional level control block;

A demodulator assigned to track the multi-path components received from one base station; and A reference demodulator for S/(N+I) measurements.

Said receiver preferably further comprises a downconverter prior to said pulse shaping filter, in order to interface at a front-end at an intermediate frequency. It can also be arranged for execution of UMTS, Satellite UMTS, Galileo, GPS, IS-2000, IMT-2000, CDMA2000, IS-95, 3GPP, 3GPP2 and/or ARIB forward link and return link waveforms.

The level control block preferably comprises:

a programmable shifter to perform coarse grain dynamic control;

a programmable multiplier to perform fine grain dynamic control;

an overflow counter operating on the most significant and the second most significant bit;

an overflow counter operating on the second most and the third most significant bit; and saturation logic to clip the result from the multiplier;

The level control block is preferably operated in a runtime control loop by the processor.

The demodulator preferably comprises:

a Rake filter, producing a signal at chip rate which is a coherent accumulation of channel corrected multipath components resulting from one base station;

a tracking unit, using said signal at chip rate for descrambling and despreading a plurality of waveform channels;

in which said Rake filter comprises:

a FIFO to buffer samples at chip rate, coming from said level control block;

a delay line containing a plurality of registers, the input of the delay line being connected to the output of said FIFO;

a plurality of finger blocks, the inputs of said finger blocks being connected to programmable tap positions on said delay line; and a summator of complex outputs of said finger blocks at chip rate.

The finger blocks are preferably respectively grouped in a late multipath group and an early multipath group, the Rake filter being arranged to accumulate the energies of the outputs of said late multipath group and said early multipath group, and to use these accumulated values to feed the time error detector of the DLL used for time tracking.

The Rake filter can comprise memories to hold one or more of the following:

spreading code for a channel correction Pilot;

scrambling code for a channel correction Pilot;

a channel correction Pilot symbol modulation;

a channel correction Pilot symbol activities.

Said memories are preferably controlled by the processor.

The finger block preferably comprises:

a channel correction Pilot descrambler;

a channel correction Pilot despreader;

a channel correction Pilot filter, first performing a coherent channel correction Pilot symbol accumulation over a programmable number of steps, and secondly producing a weighted average on a programmable number of said coherent channel correction Pilot symbol accumulation over a programmable number of steps.

a channel estimator, generating a channel estimation at chip rate, using the outputs of said Pilot filter;

a channel corrector, performing a multiplication of the incoming chip stream with the complex conjugate of said channel estimation;

a calculation of the slot energy;

a comparison of the slot energy with a programmable threshold;

a circuit to force said channel estimation to zero if said threshold is not exceeded.

The finger can be arranged for slow and fast fading compensation, by programming the channel correction Pilot filter for slow fading, said channel correction Pilot filter first performing a coherent accumulation over a slot, and secondly performing a weighted average over previous-previous, previous, actual and next obtained slot values, yielding a channel estimation per slot, which is applied by said channel corrector; and for fast fading, said channel correction Pilot filter first performing a coherent accumulation over a slot, and then deriving channel estimations through interpolating consecutive said coherent accumulations over a slot, yielding channel estimations with sub-symbol timing, which are applied by said channel corrector.

The reference demodulator preferably comprises:

an accumulator of programmable length of the absolute values of samples at chip rate; and a low pass filter operating on said accumulator output.

The reference demodulator can be arranged to operate in a runtime control loop by the processor.

The demodulator is preferably arranged to perform satellite diversity.

The communication device of the present invention can be arranged to perform accurate ranging measurements to geostationary satellites.

A further aspect of the present invention is an Integrated Circuit comprising the communication device of the present invention.

A further aspect of the present invention is an Intellectual Property core comprising the communication device of the present invention (as a building block for inclusion in an integrated circuit).

Another aspect of the present invention is a method for operating a W-CDMA communication device of the present invention, characterised in that it comprises the following steps:
configuring said device for a specific use, and
transmitting and/or receiving and/or acquiring waveform signals.

Said waveform signals are preferably selected from the group consisting of UMTS, Satellite UMTS, Galileo, GPS, IS-2000, IMT-2000, CDMA2000, IS-95, 3GPP, 3GPP2 and ARIB signals. Said configuring is preferably done by a processor.

DETAILED DESCRIPTION OF THE INVENTION

Figure 1:
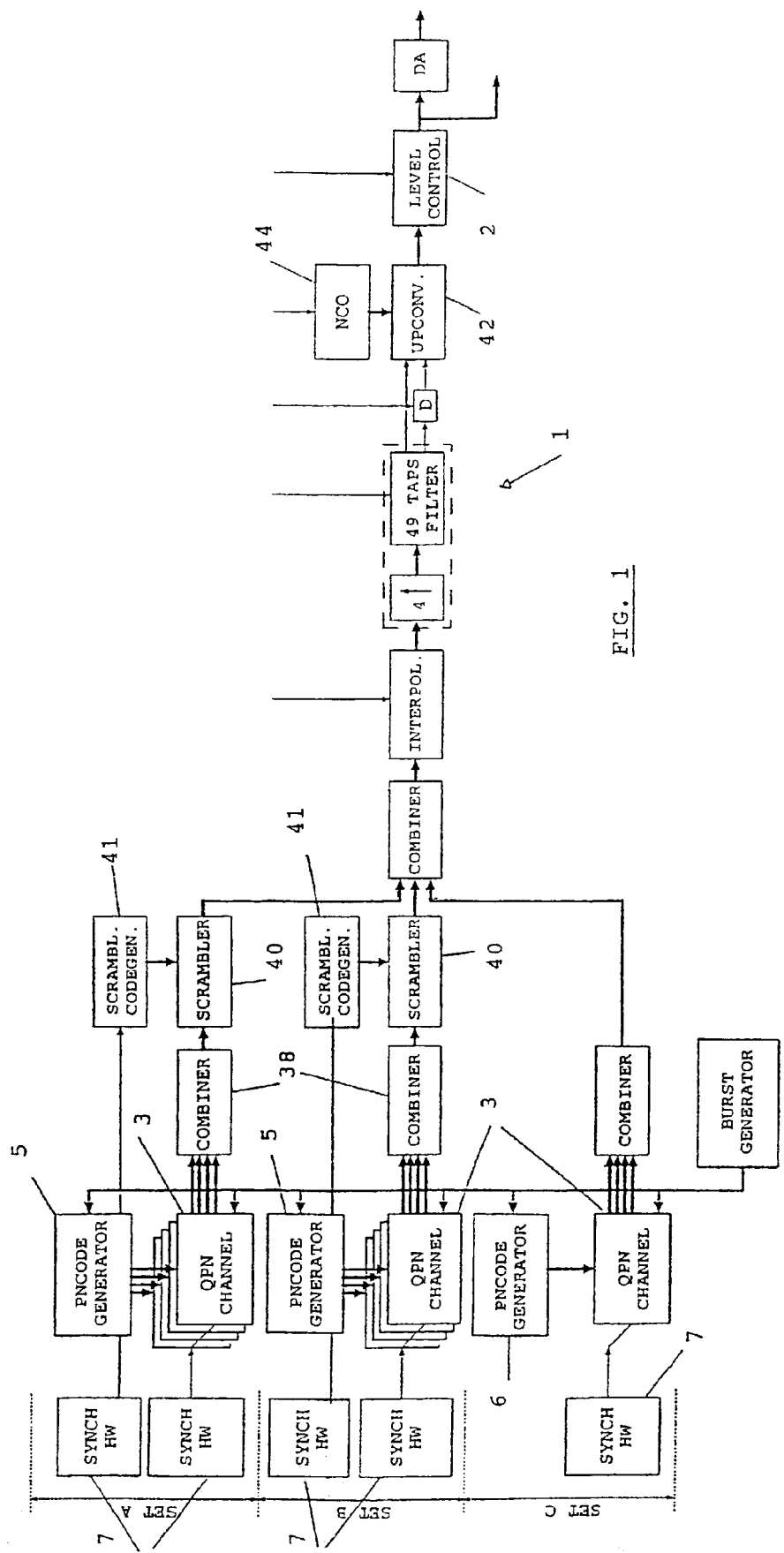
FIG. 1 represents the global transmitter structure for the device of the present invention.

Abbreviations
BCCH Broadcast Control Channel
BS Base station
CCPCH Common Control Physical Channel
DL Downlink
DPCH Dedicated Physical Channel
DPCCH Dedicated Physical Control Channel
DPDCH Dedicated Physical Data Channel
HO HandOver
LPF Low Pass Filter
MRC Maximum Ratio Combining
MS Mobile station
NC Number of Chips
OVSF Orthogonal Variable Spreading Factor
PN Pseudo-Noise
PRACH Physical Random Access Channel
QPN Quadrature Pseudo-Noise
RSSI Received Signal Strength Indication
SCH Synchronization channel
SF Spreading factor
SRRC Square Rooted Raised Cosine
UL Uplink
W-CDMA Wide Band CDMA Transmitter Specification The global transmitter structure 1 is shown in FIG. 1. It is explained in detail in the next sections.

QPN Channels with Synchronisation Hardware and PN-Code Generators

Figure 2:
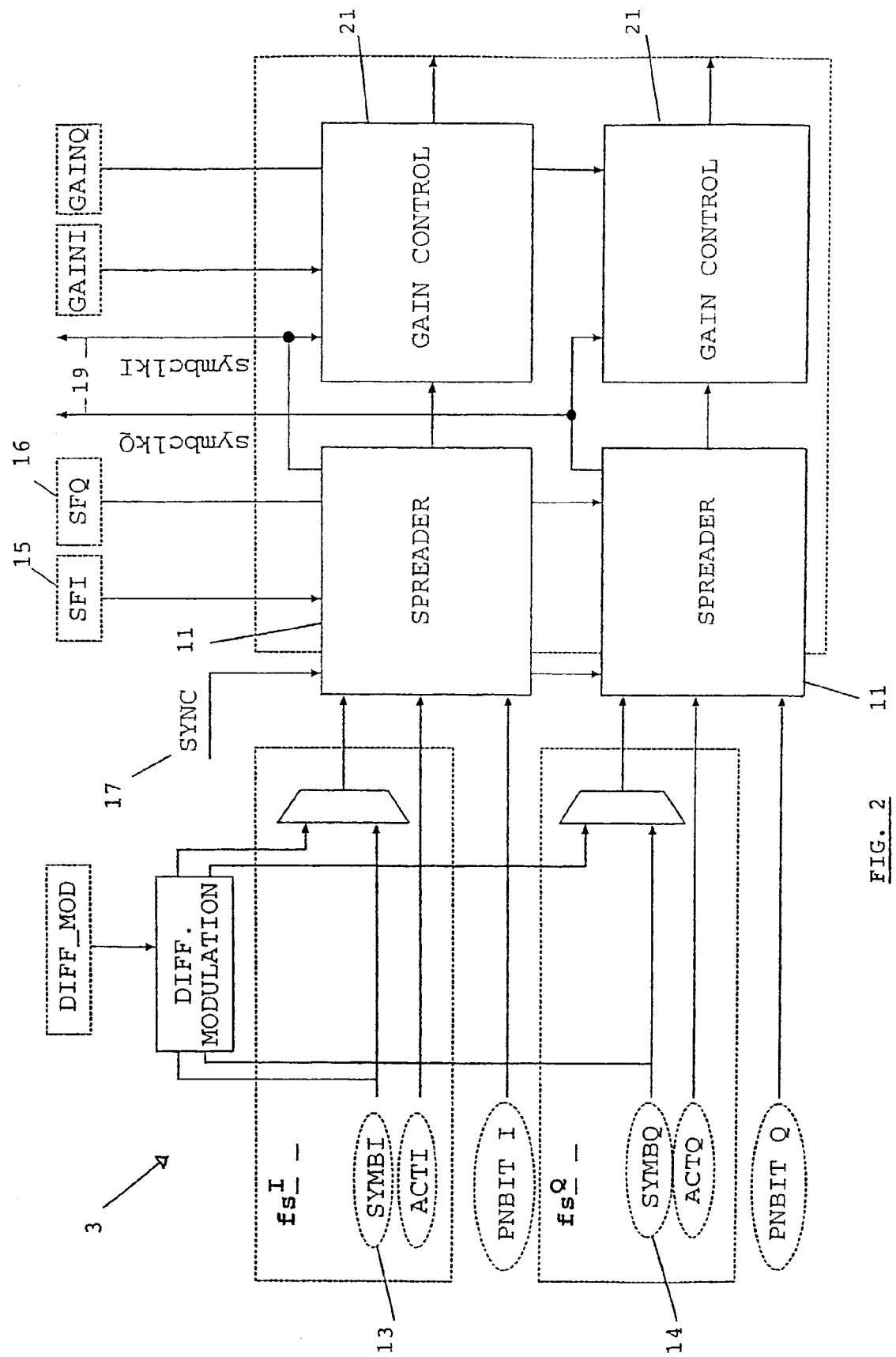
FIG. 2 represents a QPN channel.

The transmitter contains a plurality of QPN channels 3 (FIG. 2). These channels are e.g. combined in two sets of four QPN channels (set A and set B) and set C with only one QPN channel, as can be seen in FIG. 1.

Each set has a separate block for generating the PN-code 5 and separate synchronisation hardware 7 which defines the start of symbol transmission.

Synchronisation Hardware

The output of this part goes to the QPN channels of a set and defines a common symbol start moment for all QPN channels in a set. This signal is generated as a selection of 1 out of a plurality of incoming signals with a programmable offset.

The incoming sync channels can e.g. be generated by: another chip, TX timers, receiver pulse, acquisition hardware output, . . .

To generate the offset a counter at chip rate can be used. This gives an offset resolution of 1 'primary' chip. The range of the offset is [0:65535]. This is sufficient to give an offset of 1 frame for UMTS (40960 chips).

QPN Channel

Each QPN channel 3 has the functional structure represented in FIG. 2. Its functional elements are described below:

Spreader 11

The input binary symbols, coming directly from the interface (symbI 13 and symbQ 14) are spread with the PNbits PNbitI and PNbitQ. Each symbol has an activity bit (actI and actQ). When this is 0 the functional spreader output will be 0 in stead of +1 or −1.

This activity bit is used for burst transmission and for BPSK in stead of QPSK/QPN transmission.

symbI and actI are signals at symbolrate fsIxx, symbQ and actQ are signals at symbolrate fsQxx. fsIxx can differ from fsQxx. The spreading factor is set by the sfI 15 and sfQ 16 inputs.

The spreaders can be (re)started via the sync signal 17.

$$fcp = fsIxx * sfI = fsQxx * sfQ.$$

Symbol clock signals 19 (symbclkI and symbclkQ) are generated as a symbol reference for other hardware that requires symbol synchronous actions, like the gain controls 21.

Gain Control (Transmit Power Control)

Each complex spreader 11 is followed by a separate gain control 21. Each output branch of a spreader is again separately gain controlled.

PN-Code Generators

These blocks generate the complex PN codes for the QPN channels 3 (FIG. 1). A code generator 5 is foreseen per set. An example: the PN-code generators 5 for set A and B generate each 4 complex codes, while the generator 6 for set C generates only 1 one complex PN-code.

Gold Code Generator

This is a classical Gold code generator with e.g. 42 bit registers which can generate any Gold code with any length up to $(2^{42})-1$. It can also be used to generate any segment out of a Gold code smaller than $(2^{42})-1$.

The sgfb inputs define the feedback position in the shift register, the init inputs are used to initialise the shift registers at reset or restart. The poly inputs are used to program the polynomials to generate the Gold sequences. The rest signals are used to make generate a small section of the complete Gold code and then jump to the back to the init value. If the register in the gold code generator reaches the rest state, the register is in the following clock-cycle re-initialised.

RAM Based Code Generation

Figure 3:
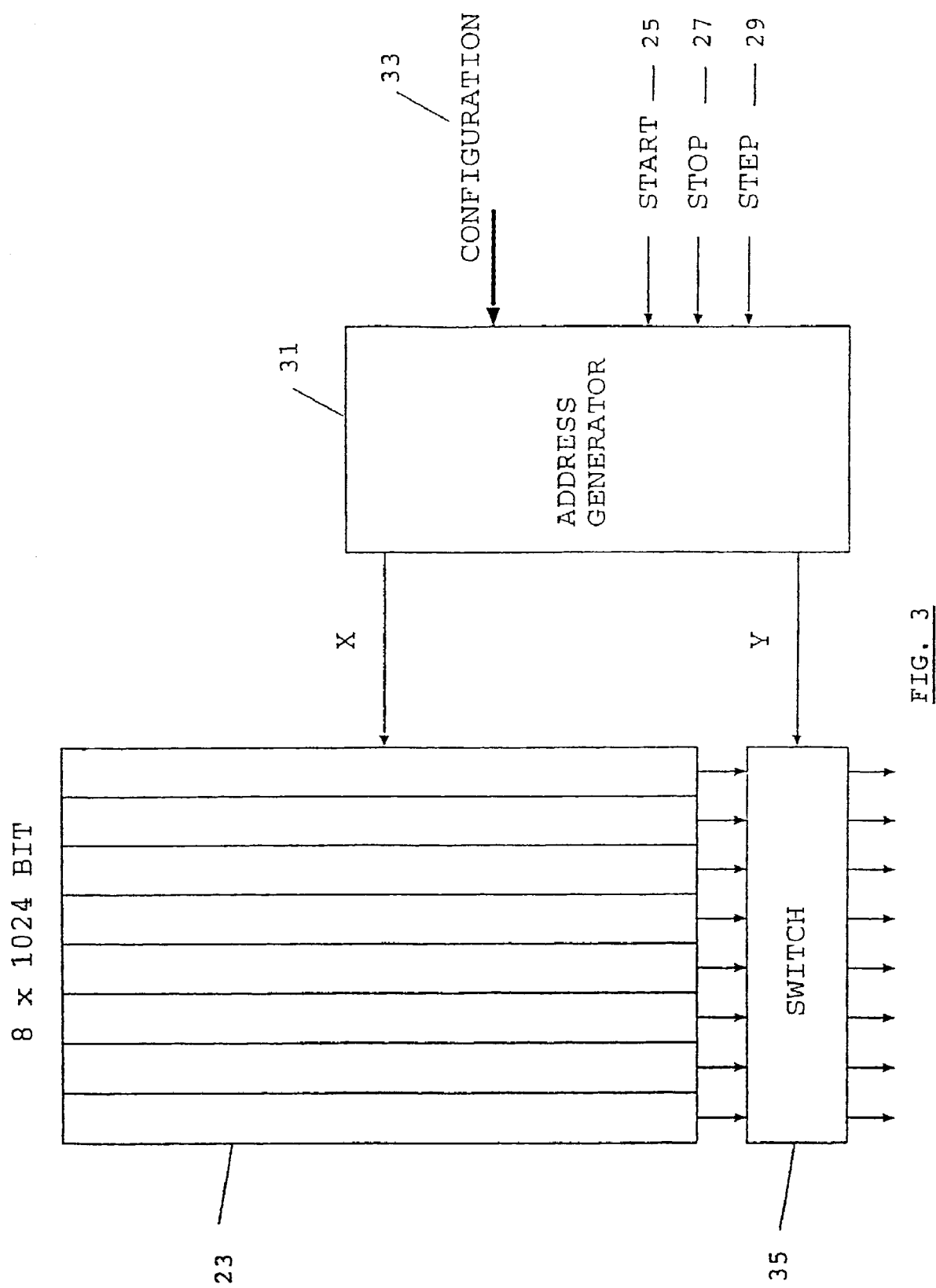
FIG. 3 represents the use of a RAM block to generate PN-codes.

Each set has a block 23 which can generate PN-codes based on a RAM. For all three sets the same block 23 is used. This is shown in FIG. 3.

The block 23 contains a RAM of e.g. 8*1024 bits. An address generator selects one row 35 of this RAM with the x address, then these 8 bit are routed to the spreaders via a switch controlled by address y.

The address generator 31 has a start 25, stop 27 and step input 29. The address generator can be configured in different ways with the configure input 33.

It is possible to stop the generators when the activity bit of a symbol is 0.

Figure 4:
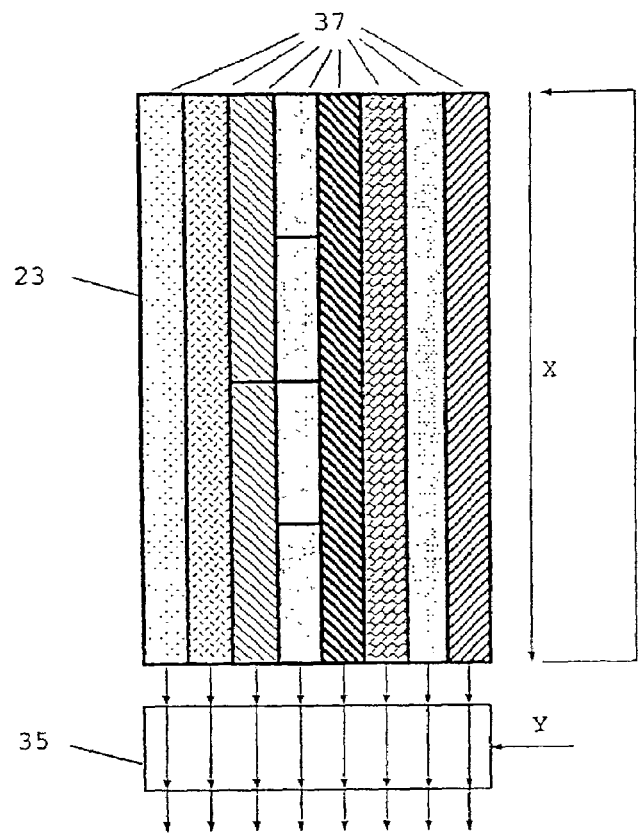
FIGS. 4 to 7 represent some possible RAM configurations for the device of the present invention.
Figure 5:
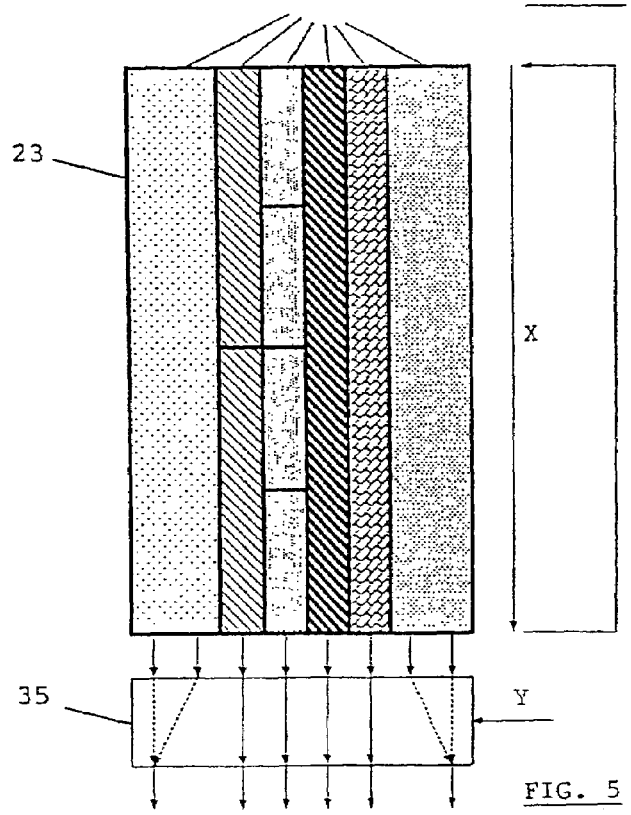
Figure 6:
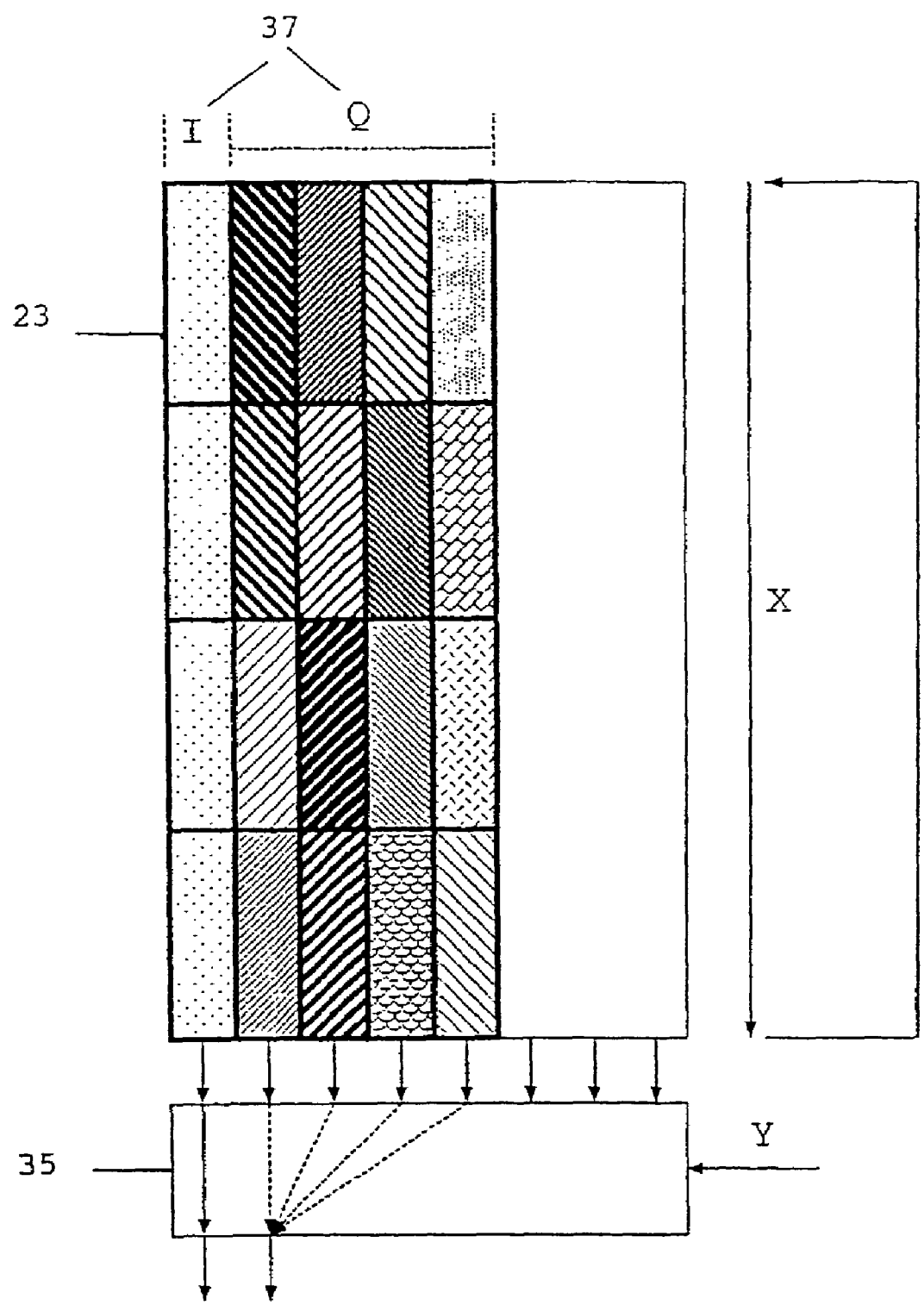
Figure 7:
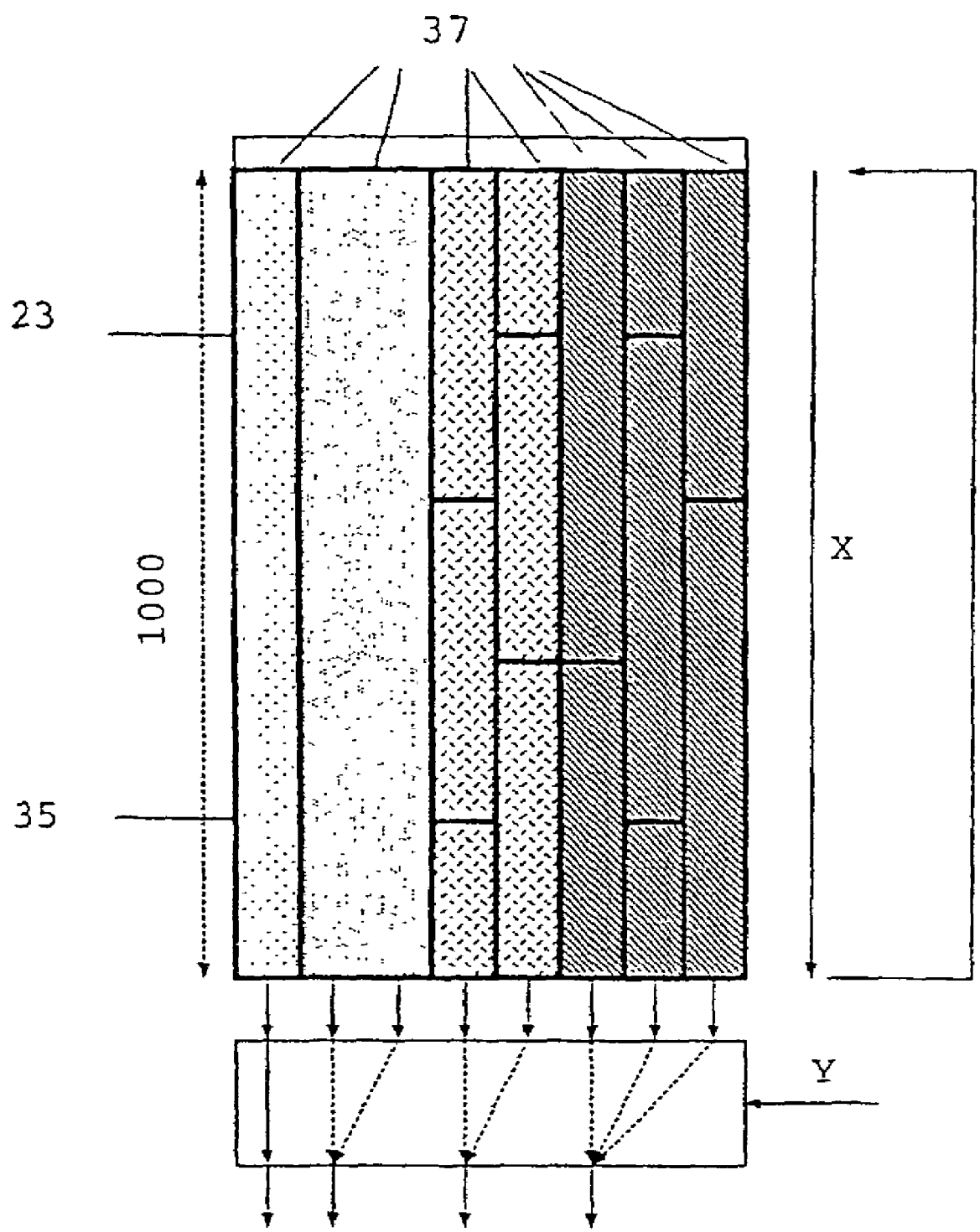

Below a number of illustrated examples of possible RAM configurations are given:
- FIG. 4: 8 BPSK streams 37, stream 0,1,4,5,6 and 7 have SF 1024, stream 2 has SF 512 and stream 3 has SF 256; x counts from 1023 to 0, y is a static value.
- FIG. 5: 6 BPSK streams 37, stream 0 and 5 have SF 2048, stream 1 has SF 512, stream 2 has SF 256, streams 3 and 4 have SF 1024; x counts from 1023 to 0, y changes between 2 values every 1024 chips.
- FIG. 6: 2 BPSK streams 37, stream 0 and 1 have SF 256, stream 0 uses continuously the same code. while stream 1 uses a sequence of 16 different codes. This scheme is usable for SCH transmission if the addresscounter is stopped when the activity bit is 0. x counts from 1023 to 0, y changes between 4 values every 1024 chips.
- FIG. 7: 4 BPSK streams 37, stream 0 has SF 1000, stream 1 has SF 2000, stream 2 has SF 400, stream 3 has SF 600; x counts from 999 to 0, y changes between 3 values every 1024 chips.

As shown in these examples, in the case of variable spreading factor transmission (e.g. OVSF codes in UMTS), it is assumed that spreading factors have a common multiple. The RAM is filled with replica's until the common multiple length is reached. In this way the symbols in one set are multiple-symbol synchronous.

Combiners at fcp Rate

The two combiners 38 after set A and set B at fcp rate output the sum of the 4 incoming complex numbers.

Scrambler 40 and Scrambling Code Generation

Scrambling Code Generator 41

This block generates the complex scrambling code $Cscramb=cI+jcQ$.

Each scrambling code generator has its own synchronisation hardware block to generate the sync signal. (see FIG. 1).

The scrambling code generator contains 2 Gold code generators with 42 bit register, 2 RAMs of 256 bit, an interface for external input of codes and some extra hardware for UMTS to modify the Gold codes.

The Gold code generators are functionally the same as the Gold code generators in the PN code generators.

This is a classical Gold code generator with 42 bit registers which can generate any Gold code with any length up to $(2^{42})-1$. It can also be used to generate any segment out of a Gold code smaller than $(2^{42})-1$.

The sgfb inputs define the feedback position in the shift register, the init inputs are used to initialise the shift registers at reset or restart. The poly inputs are used to program the polynomials to generate the Gold sequences. The rest signals are used to make generate a small section of the complete Gold code and then jump to the back to the init value. If the register in the Gold code generator reaches the rest state, the register is in the following clock-cycle re-initialised.

It is possible to re-initialize the generators after a programmable number of chips or to let them run freely.

Examples of Different Modes

Mode 0 cI and cQ are any Gold code with any length of maximum $(2^{42})-1$.

Mode 1 cI and cQ come directly from a RAM of 256 bit. it must be possible to use only the first k bits in the RAM, with k smaller than 257.

Mode 2

Mode0 but with zero extension in front of the generated Gold codes. cI=<0,c1>, cQ=<0,c2>

Mode 3 (UMTS Specific)

Mode0 or Mode1 but c1 and c2 coming from the Gold code generators or RAM are modified in the following way:

$$Cscramb=cI+jcQ=c(w+jc'w)$$

where w0 and w1 are chip rate sequences defined as repetitions of:

$$w=\{1\ 1\}$$

$$w=\{1\ -1\}$$

and where is a real chip rate code, and c' is a decimated version of the real chip rate code. The preferred decimation factor is 2, however other decimation factors should be possible in future evolutions of UMTS if proven desirable.

With a decimation factor of decim=2, c' is given as:

$$c'(2k)=c'(2k+1)=c(2k), k=0, 1, 2 \ldots$$

c1 and c2 are constructed as the position wise modulo 2 sum of 40960 chip segment of two binary m-sequences generated by means of two generator polynomials of degree 41.

The code c2, used in generating the quadrature component of the complex spreading code is a 1024-chip shifted version of the code c1 used in generating the in phase component.

Scrambler 40

The scrambling is in fact an overlay spreading without changing the chiprate, the change in chip rate is done with the Hold 1-256 block.

Input data: dI+jdQ
Input scrambling code: cI+jcQ
This block has 3 modes:
Off: output=input
Complex scrambling: output=(dI+jdQ)*(cI+jcQ)=dI*cI−dQ*cQ+j(dI*cQ+dQ*cI)
Dual real scrambling: output=dI*cI+j dQ*cQ

Interpolator with Chip Phase Control

This block is used to do a chip phase shift with a resolution smaller than 1 chip. For every sample in, one output sample is generated, input and output clock is the equidistant clock.

A linear interpolation is used to perform this function:

$$out(k)=(1-TXMU)*in(k-1)+TXMU*in(k)$$

where in(k−1) and in(k) are 2 consecutive equidistant complex samples at rate; TXMU is an input of the block and is an number (0<=TX_MU<=1).

Upsampling and Programmable Filter

The fixed upsampling with a factor of e.g. 4 (zero insertion) and a symmetrical programmable filter are realised as a complex oversampling polyphase filter. The output sampling rate f4c=4*fc.

Offset Modulation

By setting offset to 1, the Q branch will be delayed with 0.5 chip.

Complex Upconvertor 42 and NCO 44

NCO 44

This block generates a cosine and sine value. The cos and sin values are frequency and phase controllable.

The specifications below are not required for cellular, but can be used for satellite applications with demanding phase noise requirements.

The sine and cosine values are generated with the 16 MSB of a s<32,0> phase value. The 14 LSB of this 16 bit number go to 2 lookup tables which contain the values for sin and cos in [0,2*pi[ with a gain of 2047/2048. The lookup wordlength for sin and cos in quadrant 1 is u<11,11>. The 2 MSB of the s<32,0> bit phase register are used to recover the quadrant, sin and cos are s<12,11> numbers. The output of the NCO is the complex signal (cos+j·sin).

The s<32,0> bit phase register can be directly controlled via the TXPHASE input (s<32,0>) or by integrating with wrap around the TXINC (s<32,0>) value. The TXINC can be used to program the frequency of the generated sine and cosine in the following way:

$$f\sin=f\cos=TX\_INC/2^{32}*f4c.$$

With TXINC negative a negative (complex) IF will be generated.

For example, to generate a complex carrier at −20 MHz with, TXINC should be set to −1073741824.

The s<32,0> phase register should be a part of the chip boot chain.

Upconverter 42

Here a complex upconversion with the NCO generated complex carrier is done.

The computations are done full precision, the multiplications have 1 redundant bit as the most negative number will never be present in the sin or cos value. Thus the result of the multiplications are s<32,24> bit numbers. This makes the full precision outputs bit numbers.

These full precision numbers are reduced to s<35,16> numbers.

Level Control 2

The purpose of this block is to condition the signal coming from the upconverter prior to the DA conversion.

Figure 8:
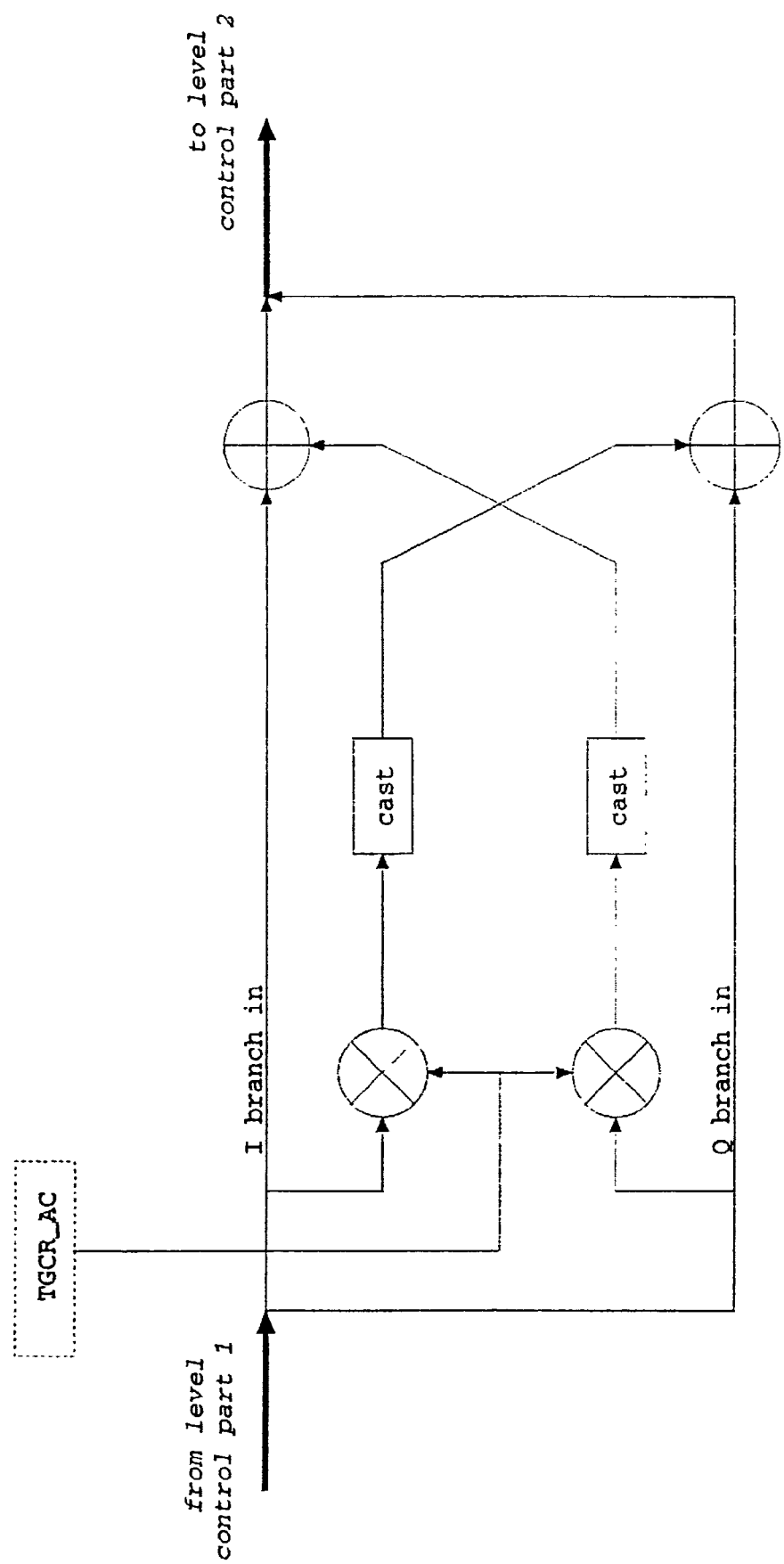
FIG. 8 illustrates the phase unbalance compensation.

Phase Unbalance Compensation (FIG. 8)

Digital phase unbalance compensation is used to remove the I,Q phase difference from 90 degrees prior to A/D conversion.

A phase unbalance compensation is done:

$$Iout=Iin+Qin*\tan(\beta)$$

$$Qout=Qin+Iin*\tan(\beta)$$

with 2β the phase angle to correct.

tan(β) is stored in the TGCR_AC variable. A range for 2β is larger than 13 degrees. The resolution of 2β is smaller than 1 degree.

The transfer of TGCR_AC is synchronous with the I0A symbol clock.

Receiver Specification

Figure 9:
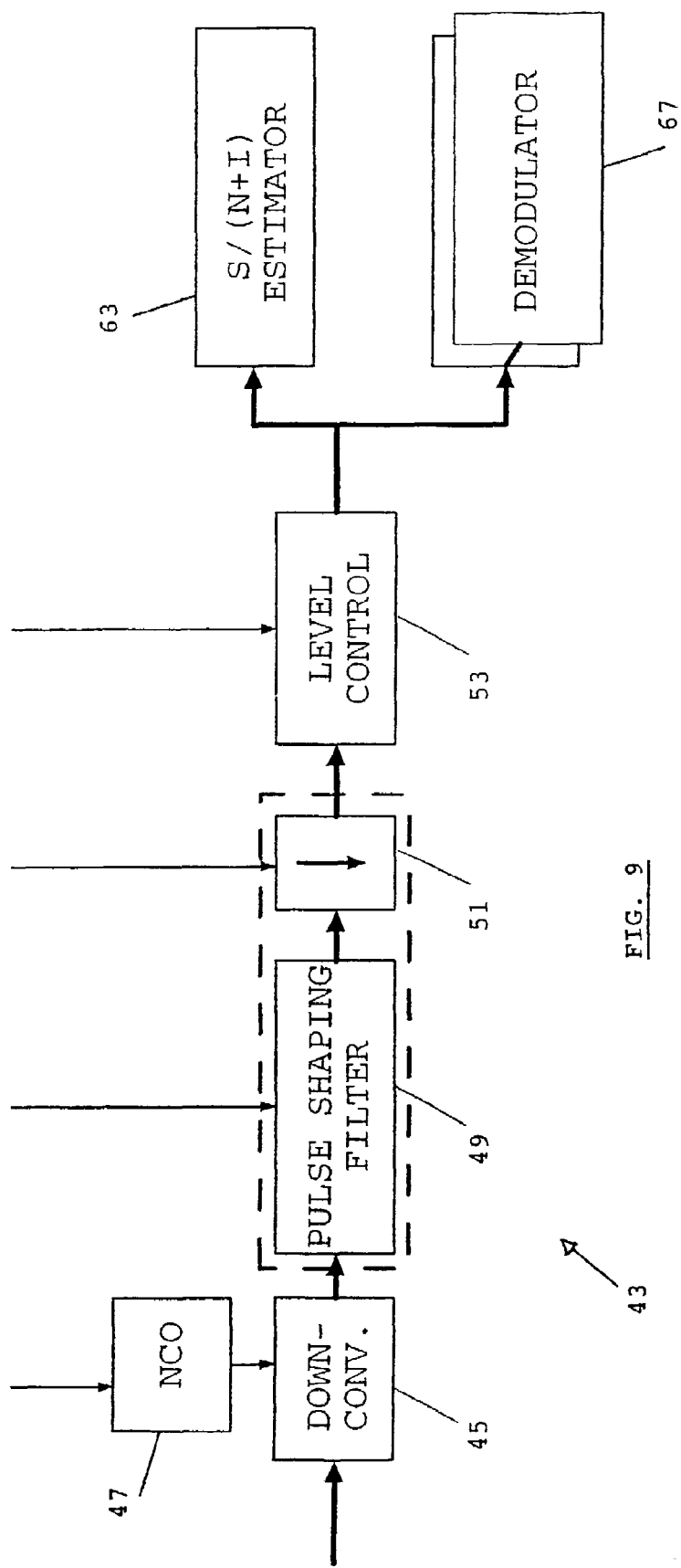
FIG. 9 represents a receiver architecture for the device of the present invention.

The global receiver structure is shown in FIG. 9. All functional blocks are discussed in more detail in the next paragraphs.

Common Downconverter with NCO 47

Downconverter 45

This block performs a complex downconversion, with the NCO generated complex carrier, on the incoming complex signal. The output signal is expected to be a near baseband signal.

| DO_MODE | data in | carrier in | output |
| --- | --- | --- | --- |
| 00 | X + jY | cos + jsin | (X + jY) * (cos + jsin) |
| 01 | X + jY | cos + jsin | (X + jY) * (cos − jsin) |
| 10 | X + jY | cos + jsin | X * (cos + jsin) |
| 11 | X + jY | cos + jsin | X * (cos − jsin) |

Input and output are at fin rate.

Programmable FIR Filter 49 with Downsampling 51

The complex receive stream coming from the downconverter is filtered by a programmable symmetrical FIR filter and downsampled with a factor RXD. RXD can be 1 or 2.

Inputs are at fin rate, outputs at f2ct rate.

Level Control 53 with Overflow Detectors

Figure 10:
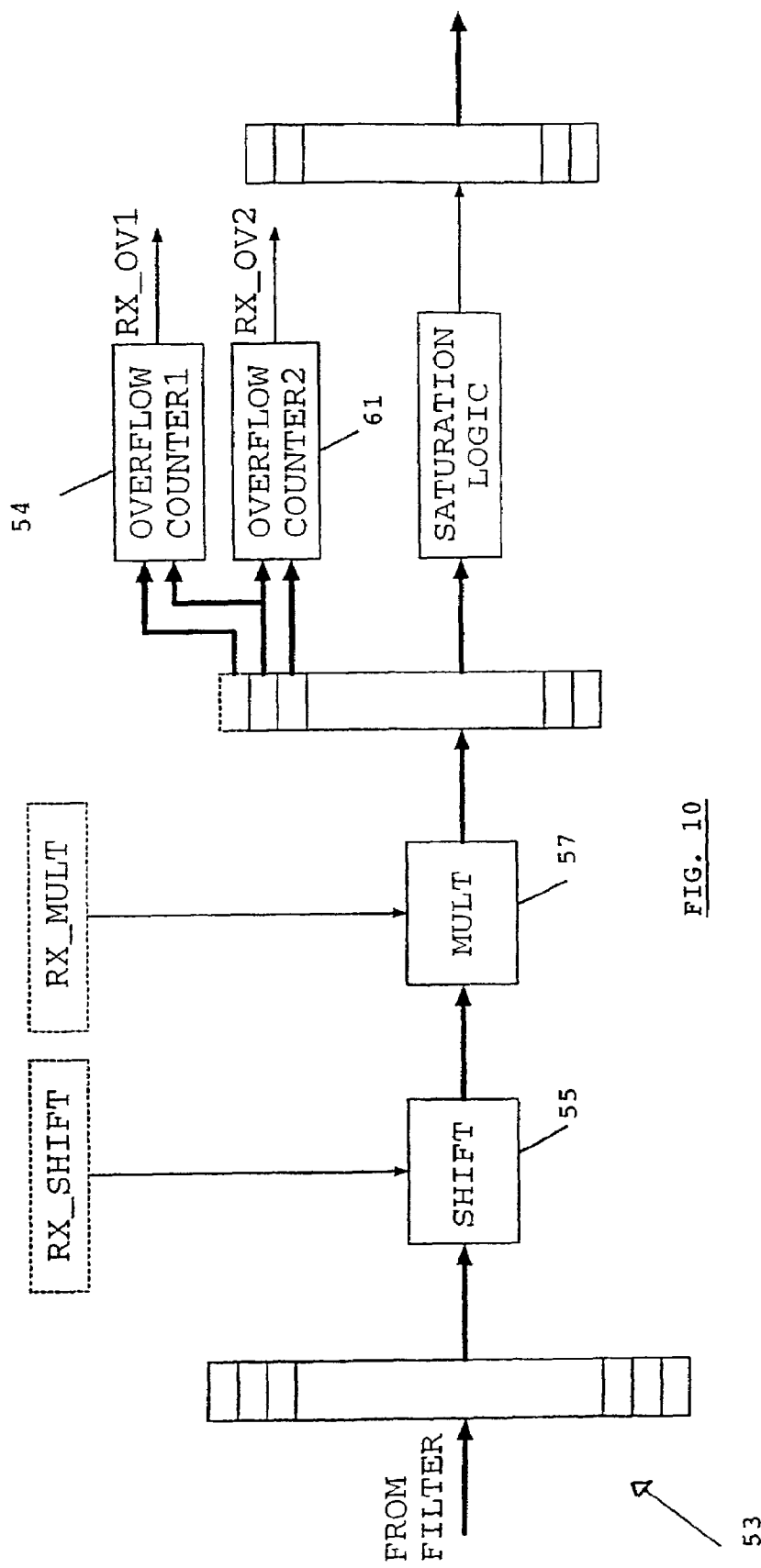
FIGS. 10, 11, 12 and 13 represent respectively a level control, a noise estimator, a general overview of a demodulator and a tracking unit usable in a device according to the present invention.

To optimise the number of significant bits going into the demodulator correlators a common level control is foreseen to adapt the level of the signal coming from the filter (see FIG. 10 for the structure).

The incoming complex data is shifted over a RXSHIFT bits 55. This is a coarse gain with 6 dB steps. A lower resolution gain control is done by the multiplication by RXMULT 57. The multiplication is followed by saturation logic (on the data) abd overflow counters. For this reason the result from the multiplication is extended with 1 MSB to produce the input for overflow counter 1. Overflow counter 1 59 counts the real overflows, so the overflows where the saturation logic saturates the signal. Overflow counter 2 61 is required to count the overflows as if the signal amplitude was twice as big.

S/(N+I) Estimator (63)

Figure 11:
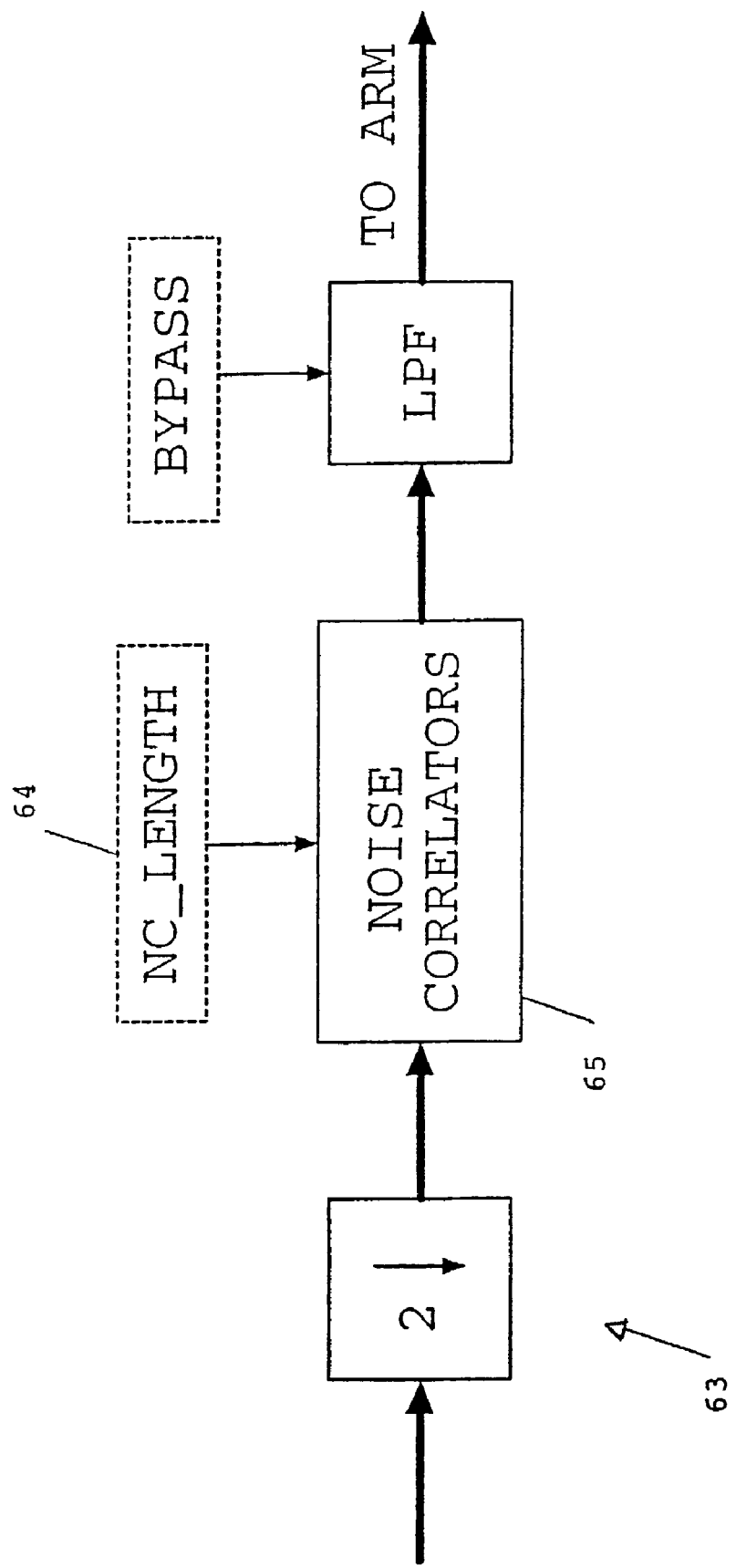

The noise estimator 63 (FIG. 11) provides a filtered complex noise correlation value which can be read by the microcontroller subsystem. This value could be used for setting thresholds in the acquisition hardware. The noise correlator 65 is just the accumulation of NC_length absolute values 64 of the complex input. In this way, an RSSI estimation is obtained.

The filter is a simple hardware low-pass filter.

By setting bypass to 1, the low-pass filter can be bypassed.

Demodulator 67

In most modes the plurality of demodulators are used to support base station diversity for soft hand-over, however they can also be used for other purposes. In the following paragraphs the demodulator structure will be explained in more detail.

Figure 12:
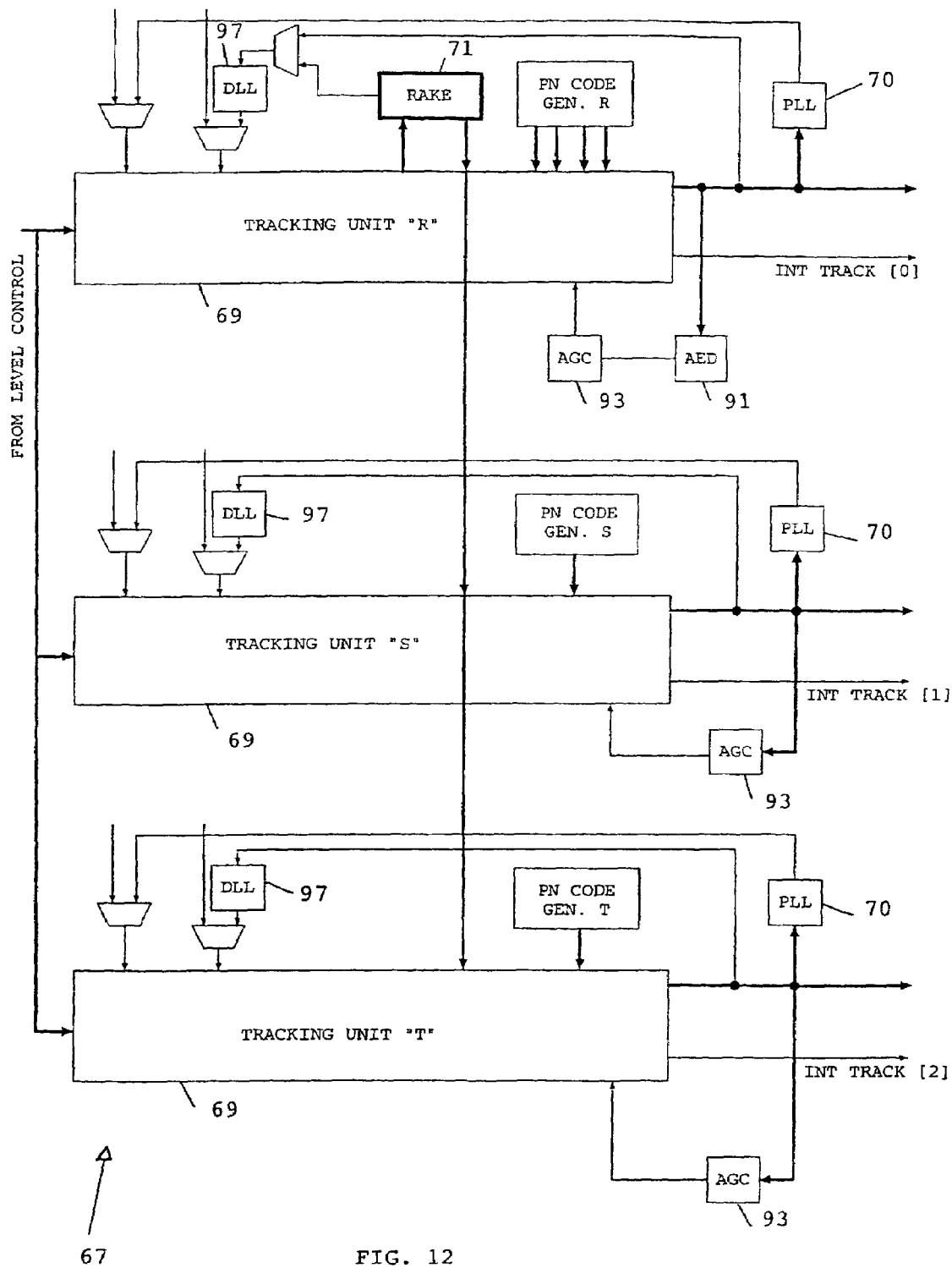

FIG. 12 gives a general overview of a demodulator 67. It consists of a number of tracking units 69 with their peripheral hardware like code generators and feedback signal generators like PED with PLL 70, TED with DLL 97, AED 91 with AGC 93. This will be discussed in more detail further.

Each demodulator also has a Rake block 71 performing a combination of channel corrected multipath components. This block will also be discussed in more detail later.

Not all the hardware in FIG. 12 is used at the same time. This depends on the configuration. It is possible to turn off idle blocks to save power.

Tracking Unit 69

Figure 13:
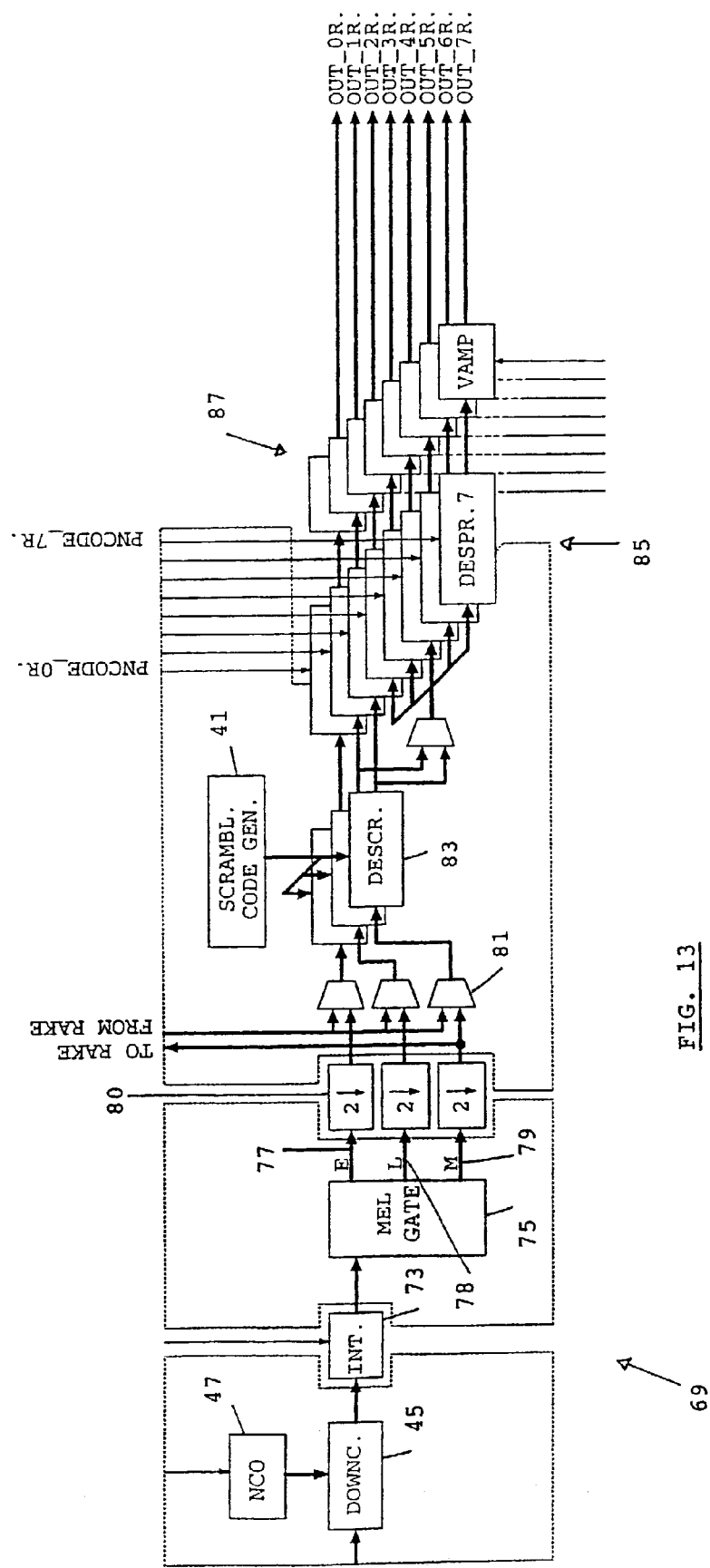

Each of the e.g. 3 tracking units 69 (FIG. 13) has the same input: the complex signal coming from the common level control. It is possible to track one signal source with one tracking unit. A signal source can be a physical transmitter or it can be a multi-path component coming from one transmitter. So in one demodulator we can e.g. track 3 satellites or track 3 multi-path components (as an alternative to the use of the above mentioned Rake) from a terrestrial base-station. The functional blocks within a tracking unit are described below.

Tracking Unit Downconverter 45 and NCO 47

This block is used as actuator for the carrier phase/frequency tracking. A final downconversion is performed.

Tracking Unit Interpolator 74 with Chip Frequency Control

This block is used as actuator for the chip phase/frequency tracking. This is done by a pseudo-chip rate change. The outcoming chip rate is controlled via the DINT input.

Linear interpolation between samples spaced approximately 0.5 chip is performed by:

out($k$)=(1−INTMU)*in($k$−1)+INTMU*in($k$)

where in($k$−1) and in($k$) are 2 consecutive equidistant samples at f2c rate.

The DINT input is used to change the INTMU continuously by adding DINT to the previous value of INTMU every cycle. This results in a change in chiprate by 1/(1+DINT).

INTMU in [0:1[: one input sample produces 1 output sample when INTMU 0: two output samples are produced for one input sample, and INTMU is wrapped back into[0:1[ when INTMU>=1: no output sample is produced for one input sample and INTMU is wrapped back into [0:1[

This block causes a delay of 1 sample. For example, when DINT=cte=0, out=in $z^{-1}$ with a 0.0 added at the start.

The input samples are equidistant at f2c rate. The output samples of the interpolator are not equidistant at f2cr rate. f2cr is between f2c/2 and 2*f2c. So all the hardware after the interpolator must be designed to work at 2*f2c although its nominal rate will be f2c.

MEL Gate 75

This MEL gate 75 is only used in no-cellular modes; otherwise it's bypassed through the appropriate multiplexer settings. The incoming stream at f2cr is split in three streams at f2cr rate.

$E=\text{in} \cdot z^{-2}$ $M=\text{in} \cdot z^{-1}$ $L=\text{in}$

In this way each stream is spaced 0.5 chip.

The M signal of Tracking unit 0 is also used as input for the Rake block, if it is activated (see further).

Downsampling 80 Factor

A phase controllable downsampling with a factor e.g. 2 is performed here by skipping 1 incoming sample of 2 incoming samples. D2 defines which phase to skip. The output rate is fc=f2cr/2.

Chip Stream Selection

The 3 multiplexers 81 allow to choose between which signal goes to the final correlators 83. This can be the downsampled signal coming from the MEL gate or it can be the Rake output at chip rate.

Scrambling Code Generator 41

This is functionally the same as the transmitter scrambling code generator, but at fc rate.

Descrambler 83

Input data: dI+jdQ

Input scrambling code: cI+jcQ

This block should have 3 modes:

Off: output=input

Complex descrambling: output=(dI+jdQ)/(cI+jcQ)= (dI·cI+dQ·cQ+j(−dI·cQ+dQ·cI))/2.0

Dual real scrambling: output=dI*cI+j dQ*cQ

In the 3 modes the delay between in and output should be the same. Input and output are at fc rate.

Despreaders 85

Each tracking unit contains a number of QPN despreaders. Each despreader and each branch of the despreader can have a different spreading factor.

Variable Amplifiers 87

This block is used as actuator for the signal amplitude tracking. Each Vamp 87 can have a different gain.

The output of the Vamps are the soft symbols MD, MP, EP and LP which stands for Middle Data, Middle Pilot, Early Pilot and Late Pilot but when in Rake (UMTS mode) these signals have completely different meanings than these names suggest.

PN-Code Generators 89

This block generates the complex PN-codes for the despreaders 85. This is a similar block as in the transmitter. So possibility to use a RAM, Gold code generator or an external input.

Tracking unit 0 is equipped with e.g. 4 separate generators, unit 1 and 2 have only 1 generator. So the 4 despreaders in unit 1 and 2 use the same despreading code.

AED 91 and AGC 93

The AED 91 is the error detector for the signal amplitude tracking. The AGC 93 does a filtering on this signal and outputs the signal going to the Variable amplifiers.

Tracking unit 0 has 4 separate AED and AGC for each despreader in the tracking unit, while tracking unit 1 and 2 only have a common AED and AGC working on the MP signal.

PLL 70

The NCO of each tracking unit can be set by an external block like ARM software or can be controlled by the PLL. The PLL works on the MP signal. When the Rake is used, the PLL is turned off.

TED0, TED1 and DLL 97

The TED0 or TED1 are used as error detectors for the chip timing tracking. TED1 is used when the CCP is used as a signal source for the despreaders of the unit, while TED0 is used when classic Early-Late correlator tracking is done. The output of the TED 91 goes to the DLLs, chip frequency controlling the interpolator.

Symbol Combiner (Not Shown)

When the 3 tracking units are used for tracking different multipaths of the same signal, a hardware combination of the 3 CD outputs can be performed. Functionally this is only an addition of the complex CD numbers. However the symbol timing of CD[0], CD[1] and CD[2] will be different which will complicate the coherent symbol combining.

Rake Receiver 101

Figure 15:
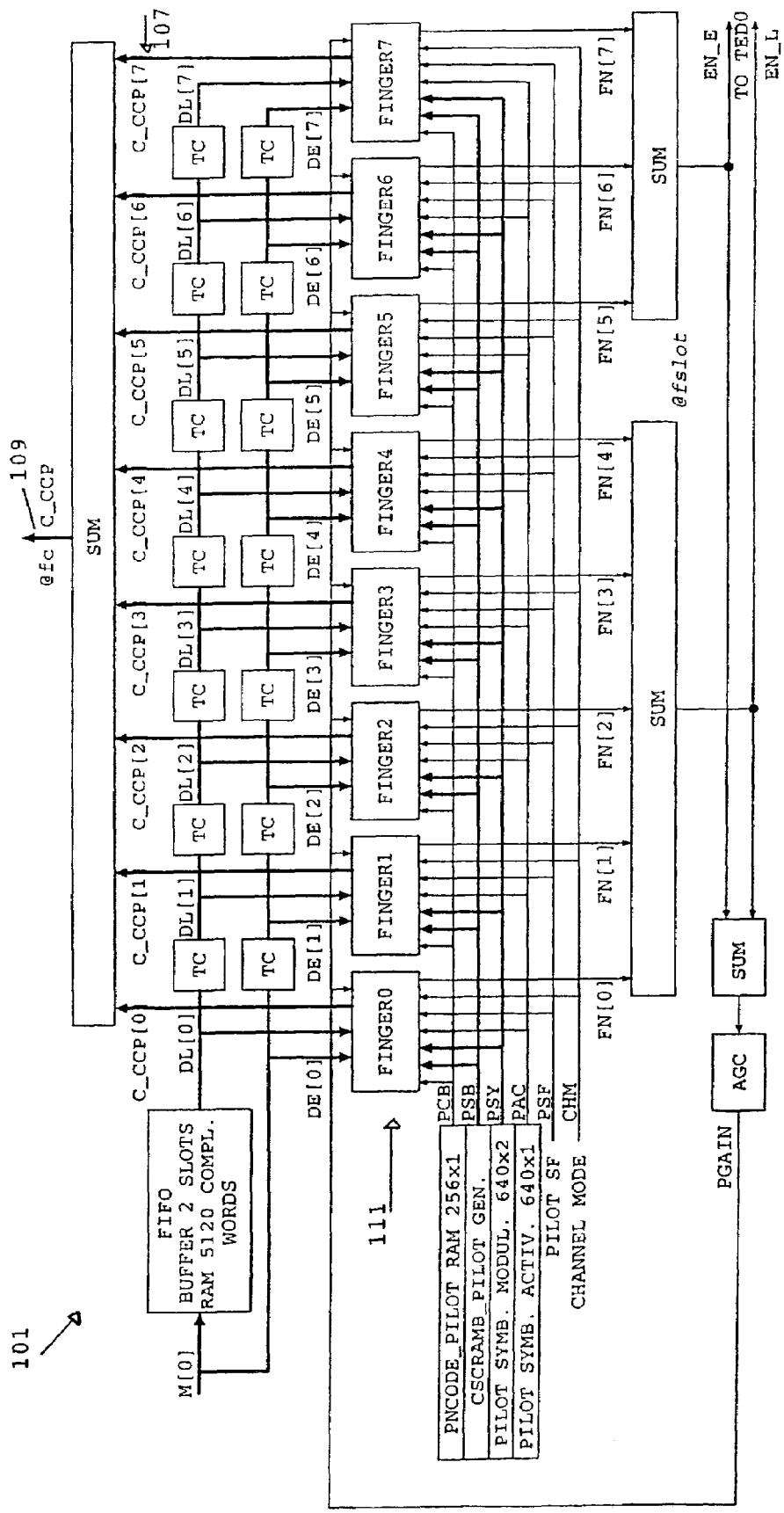
FIGS. 15 and 16 represent respectively a Rake Receiver and a Rake Finger according to the present invention.

This block (FIG. 15) performs a weighted coherent combination of a plurality of taps selected on a delay line of the chip stream, resulting into one new chip stream. To combine them weighted coherently a channel estimation (amplitude, phase) of each of the delayed chip streams is made. This block is discussed in detail further.

Demodulator Using Rake

This section gives a detailed explanation on the use of the demodulator as a receiver where multipath components are coherently combined at chiprate. The Rake block of the demodulator is only used in this mode and is also discussed in detail in this section.

This specification is e.g. for reception of a UMTS waveform.

Figure 14:
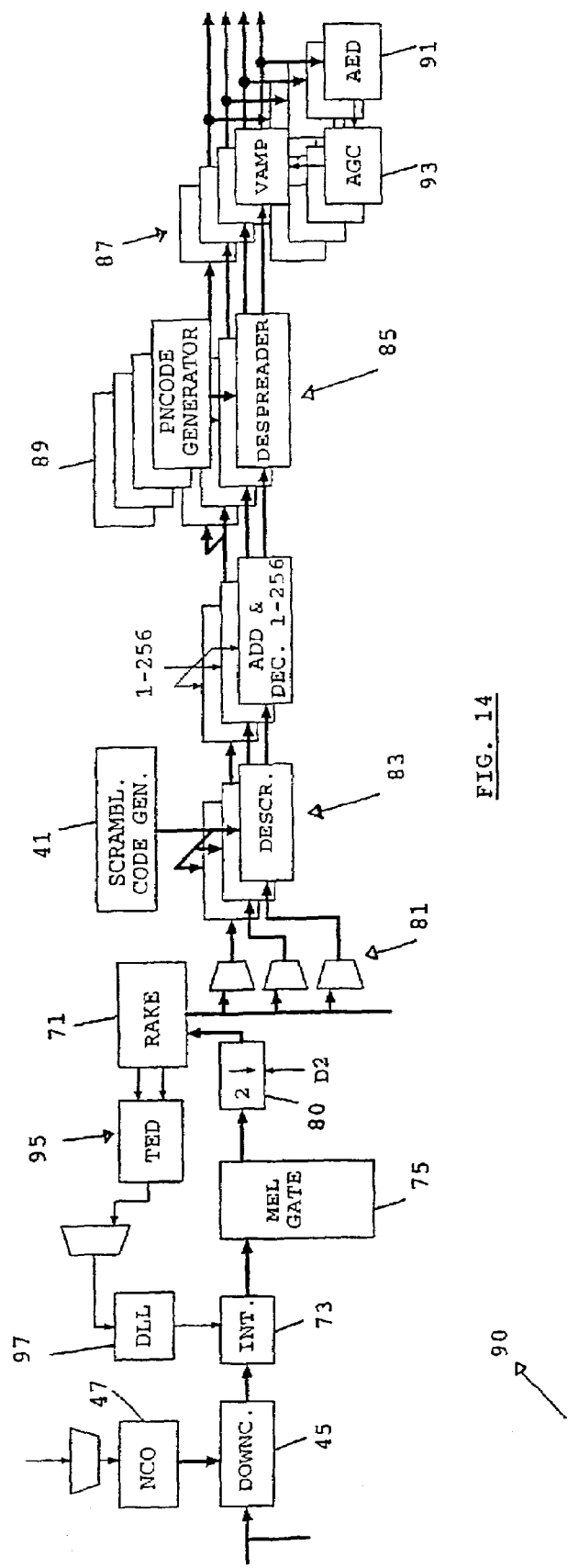
FIG. 14 represents a possible configuration of a demodulator for UMTS mode, using only 1 tracking unit.

A possible configuration of a demodulator for UMTS mode, using only 1 tracking unit 90, is shown in FIG. 14.

The Rake-based demodulator configuration reuses almost everything from the tracking unit except for the PLL and PED. A large extra block that is not used when using Early-Late correlator tracking is the Rake 71. So roughly said the Rake-based demodulator consists of the Rake that generates a new chip stream from the incoming chip stream and the classic descrambler 83, despreader 85, . . . hardware.

With the configuration of FIG. 14 it is possible to receive 4 QPN channels. These channels must be synchronous as they use the same Rake receiver. These 4 QPN channels must also have the same scrambling code. With tracking unit 1 and 2 with Rake as input (not on figure) we could receive 2 extra QPN channels with a different scrambling code. They must still be synchronous with the other channels. To receive two asynchronous transmitters one must use the 2 demodulators.

The only despreading in the Rake is the pilot symbol despreading used to make the channel estimations.

Chip phase tracking is done by a timing error detector (TED0) and DLL working at slotrate.

More details can be found further.

Rake Overview

This part (FIG. 15) performs the coherent combination of a plurality chip streams 107 into one new chip stream 109. We have e.g. 8 fingers 111, where a channel estimation is done for that chip phase with the aid of pilot symbols. This channel estimation is used to 'correct' the chip stream of the respective finger, after which all fingers can be combined. MRC with optional zero forcing is used to combine the different chip phases.

The pilot symbols can have a SF from 4 to 256 and may be arbitrarily distributed over the slot.

Fingers 0 to 4 contribute to the Late multipaths, fingers 5 to 7 to the Early multipaths. Note that there is no real 'Middle' finger, this means that in the case of a single path, the correlation energy will be split over finger 4 and 5 and one will never correlate at the 'top' of the correlation shape.

In one of the possible ways of using the Rake, it will be initialised so that the strongest peak will be between finger 4 and 5. With the phase controllable decimation (D2) the chip phase can be set with a resolution of ½ chip.

Each finger has as inputs:

Pcb: the codebit for despreading the pilot chipstream. The spreading code is stored in a RAM of 256 bits. This is a real signal, no QPN pilot is possible.

Psb: the complex descrambling bits coming from the descrambling code generator.

Psy: the data modulation on the pilot symbols. One can use a RAM to store the modulation of a complete slot, so one needs a RAM of 640×2 bits. When a higher SF is used not all 640 locations will be used. Eg with SF 256 only the first 10 locations of the RAM will be used. Pilot modulation can change on a slot to slot basis.

Pac: activity bit for pilot symbols. This eliminates the need for having the pilot portion as a continuous portion at the beginning of the slot. Again a RAM of 640×1 could be used.

Psf: The pilot SF.

Chm: channel mode parameter, selects the algorithm to use to make the channel estimations. (slow fading: 0, fast fading 1).

Other configuration inputs like: threshold to decide on which finger there is a signal, filter coefficients for channel estimation filtering, etc. They are not on FIG. 15 as they are too detailed for this drawing.

NOTE: the RAMs of 640 bits could be smaller if it is not required that we could have a burst of pilot chips equal to 4 chips anywhere in the slot. It is most likely that this is not required. E.g. 8 consecutive pilot symbols SF can be replaced by 1 pilot symbol with SF 32.

Each finger has a complex CCCP[x] output at chip rate. This is the delayed chips multiplied with the complex conjugate of the channel estimation of finger x.

Each finger also has a FNx output at slot rate which is the energy of the coherent accumulation of all pilot chips/symbols in a slot of finger x.

The sum of all FNx is calculated and goes to the pilot AGC. In this way CCCP will not be dependent on the pilot energy.

As one has fixed finger spacing we only need a global DLL.

The DLL will work on slot rate, the Late and Early energies are calculated as:

$$ENL = FN0 + FN1 + FN2 + FN3 + FN4,$$

$$ENE = FN5 + FN6 + FN7.$$

ENL and ENE go to the DLL which feedbacks to the interpolator at the input of the demodulator using the Rake filter.

Rake Finger 115

Figure 16:
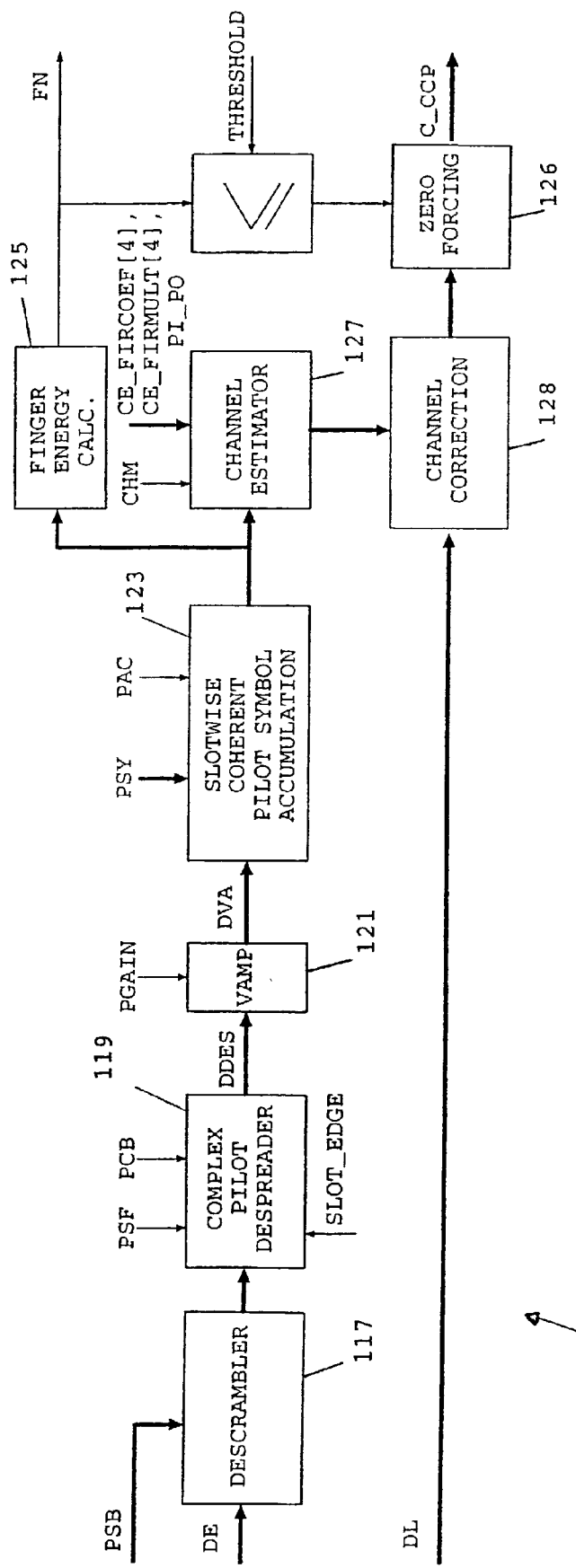

This section describes the fingers architecture (see FIG. 16).

Descrambler 117

The incoming chips are descrambled with Psb. This code and its phase is common for all fingers. The phase has to be set during an acquisition process initialising the Rake. Has the same functionality as the other descramblers.

Complex Pilot Despreader 119

The complex signal coming from the descrambler at chip rate is despread with the pilot PNcode (Pcb), only 1 despreader, so the pilot must be a QPSK or BPSK signal.

The pilot PNcode has a PNlength of Psf. $4 \leq Psf \leq 256$, and $k*Psf=2560$ with k a positive integer.

The despreader works continuously and is synchronised to the slot edge at chip rate. This means that a new symbol starts at the start of the slot (slot-edge=1).

Variable Amplifier 121

The complex symbol coming from the despreader is sent through the Variable Amplifier (VAMP) 121. The complete CCMR has one global AGC which sets the Pgain at slotrate.

For different spreading factors, the initial gain must be set to a different value, eg to 1.0 for SF 256, to 64.0 for SF 4.

Pilot filter 123. Slotwise Coherent Pilot Symbol Accumulation 124

Figure 17:
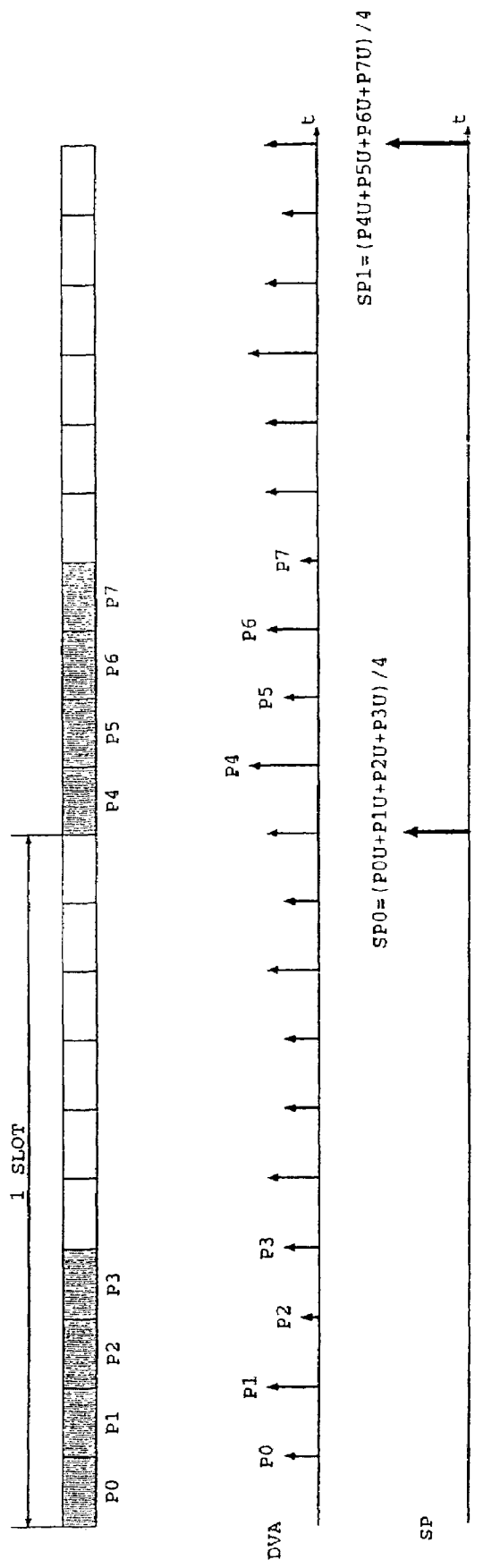
FIG. 17 represents slotwise coherent pilot symbol accumulation according to the present invention.

In this block a coherent pilot symbol accumulation is done on a slot by slot basis. The Pac input defines if the symbol coming from the VAMP is a pilot symbol. See FIG. 17.

In this example the Psf is 256, Pac would be 111100000 . . . 0000.

Pi with i=0, 1, 2, . . . the pilot symbol index, are the complex despread pilot symbols Dva (@fsymbB). In order to accumulate them coherently, the pilot modulation must be removed first. This modulation is known a priori and must be present at the Psy input. For QPSK Psy can take 4 values: +1, −j, +j, −1.

For QPN Psy can take 2 values: +1 and −1. So Psy is represented by a 2 bit value (Psy[0] and Psy[1]).

The values Pi are then demodulated in the following way (Piu are the demodulated values of Pi) (u=unmodulated):

| Psy[0 . . . 1] | Pi | Piu |
|---|---|---|
| 00 | Pii + j * Piq | Pii + j * Piq |
| 01 | Pii + j * Piq | −Piq + j * Pii |
| 10 | Pii + j * Piq | Piq − j * Pii |
| 11 | Pii + j * Piq | −Pii − j * Piq |

For QPN Psy must only take the values 00 or 11.

Spj are the complex accumulation of these demodulated pilot symbols from the current slot, divided by the number of pilots (or multiplied by 1/number of pilot symbols)

Sp=accumulation of Piu, divided by the number of Pilot symbols.

This is equivalent with despreading over all the pilot chips in the slot in the case of unmodulated Pilot symbols.

Sp values are generated at slot rate fslot. The value is available at the end of the slot.

This module is slot-synchronous.

Finger Energy Calculation 125

Figure 18:
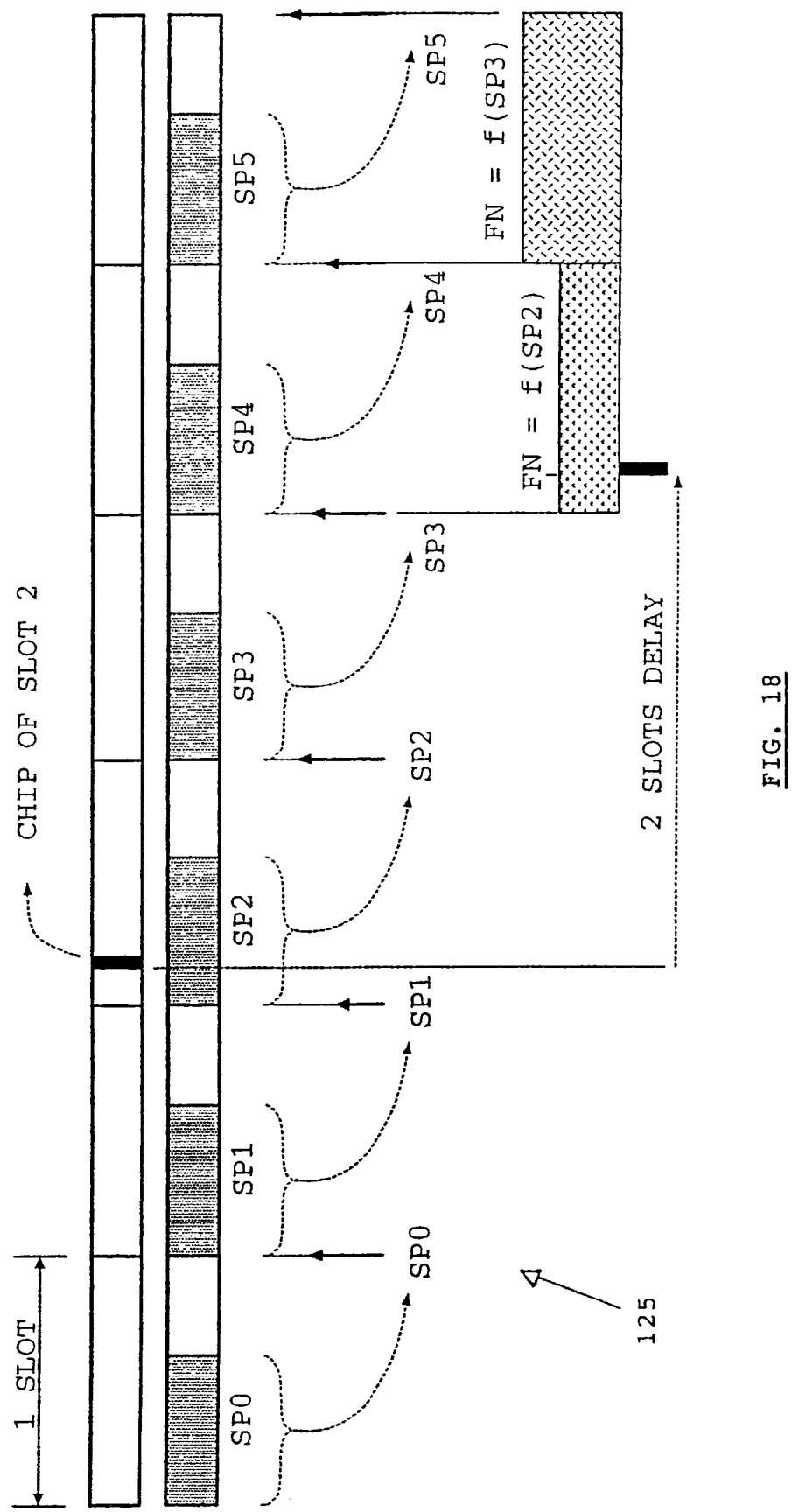
FIG. 18 represents finger energy calculation.

Here a measure for the finger energy is calculated slot by slot. Because there is a delay of 2 slots on the chips we would also calculate the energy from a delayed Sp value. This is shown in FIG. 18.

The energy is calculated as follows: $Sp\_i^2 + Sq\_q^2$. With a delay of 1 slot on Sp.

This energy will be used for the DLL and zero forcing.

Channel Estimator 127

This block performs a filtering or interpolation on the Sp values.

The exact function to perform depends on the Chm (channel mode) input (fast or slow fading channels).

The output of this block is the channel estimation ces at chiprate.

When Chm=0, the Ce_FIRcoef[4] and Ce_FIRmult[4] inputs are needed, when Chm=1 the pipo input is needed.

Channel Mode 0: Slow Fading 131

Figure 19:
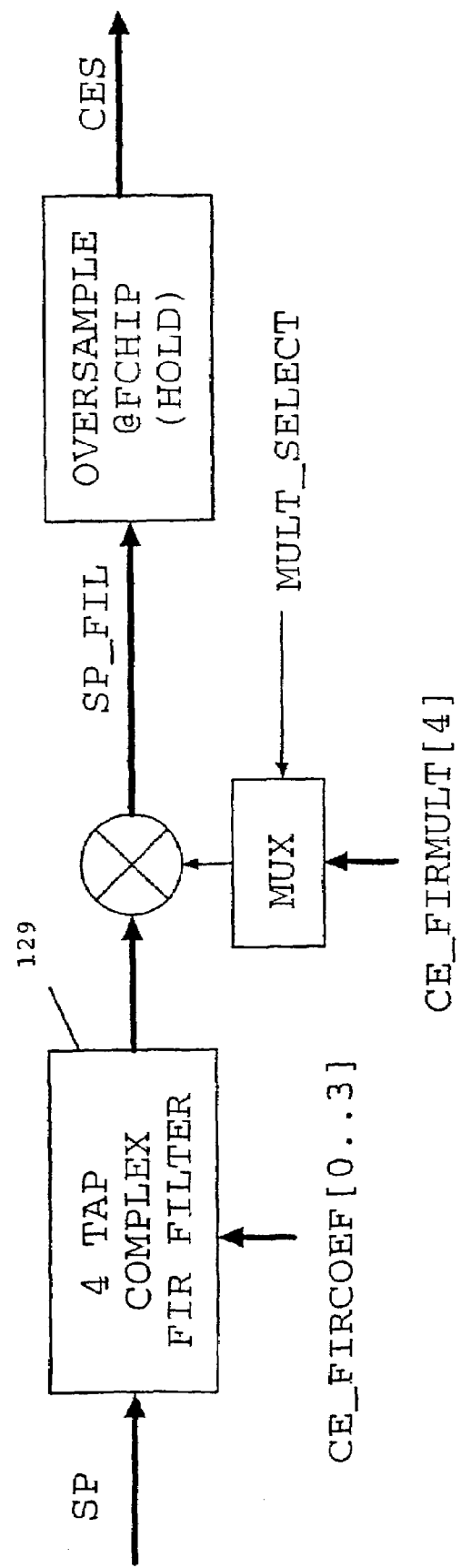
FIG. 19 represents a slot weighing filter for the device according to the present invention.

In this mode ces is constant over a complete slot. ces is a filtered version of the incoming Sp values. See FIG. 19.

The multiplication after the filter is to have a FIR filter 129 with unity gain. To avoid a transient in the amplitude on the signal coming from the filter, 4 different values are stored for this gain. The first output of the filter gets gain CeFIRmult[0], the second output CeFIRmult[1], the third CeFIRmult[2] and CeFIRmult[3] is used on sample number 4 leaving the filter and in steady state mode.

All filter taps should be initialised to 0 at the start of the process.

Figure 20:
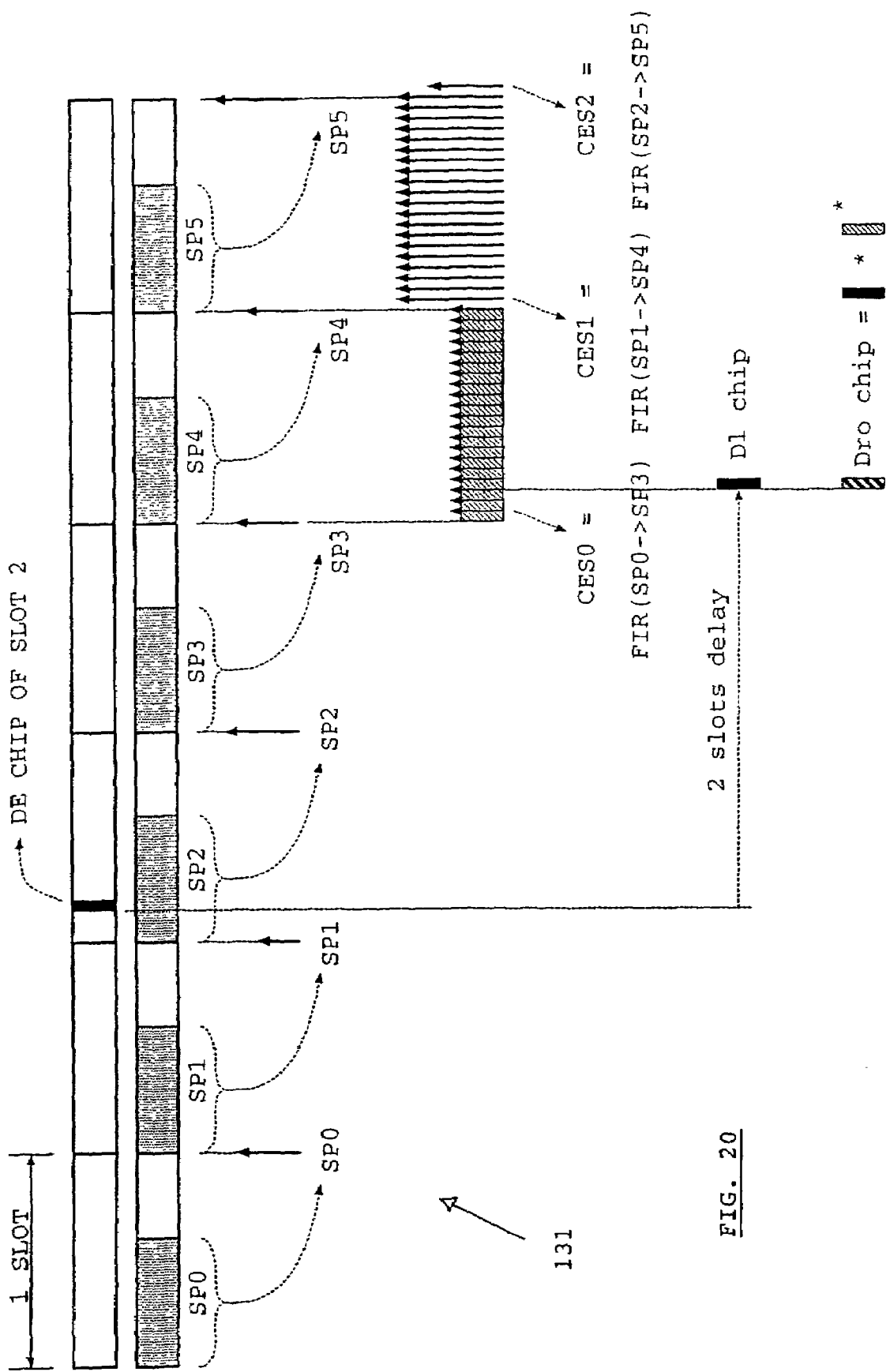
FIG. 20 shows an overview of the Rake finger process in the case of Channel Mode 0.

The filter and multiplier work at slotrate fslot, ces are samples at chiprate. (oversampling of filter output). FIG. 20 gives an overview of the Rake finger process 131 in the case of channel mode 0.

The different pilot symbols are demodulated and coherently accumulated giving the values Sp0 to Sp5. The channel estimations ces are the output of the 4 taps FIR filter, ces0 is a function of Sp0 to Sp3. ces0 is constant over slot number 4. The De chip from slot 2 is delayed 2 slots so that it is available with slot 4 as D1 chip. This chip is multiplied with the complex conjugate of ces0 to give the Dro chip of this finger.

It is clear that the chip arriving in slot 2 is 'corrected' with the info from pilot symbols of slot 0,1,2 and 3.

Every chip is always corrected with the aid of the Before Before, Before, Present and After slot. (unless some filter taps are set to 0). Channel estimations change only at slot rate. Note that Sp3 is generated together with the last chip of slot 3 while ces0 which is a function of Sp3 is used for all chips of slot 4.

Channel Mode 1: Fast Fading 133 and 135

Figure 21:
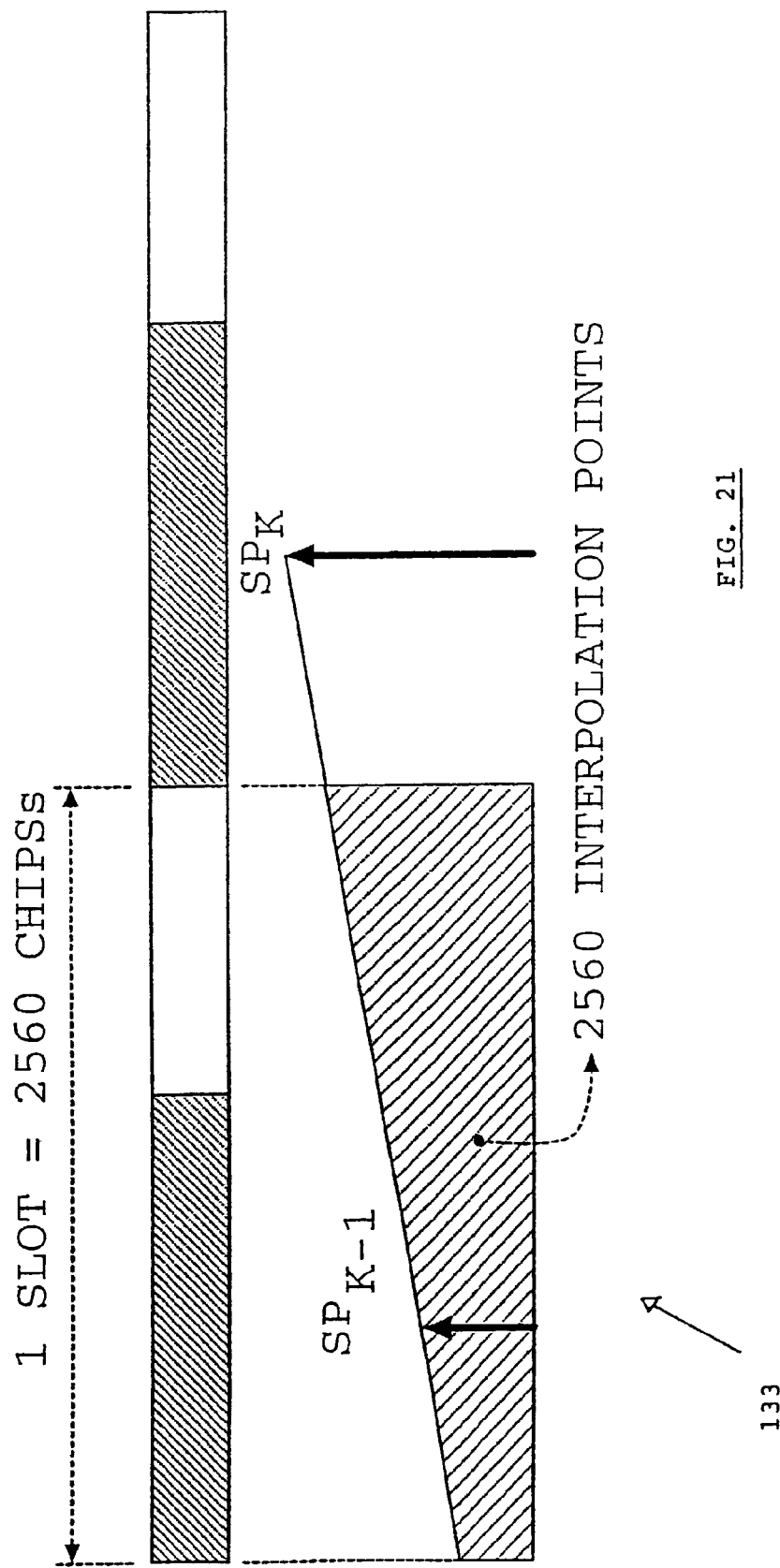
FIGS. 21 and 22 draw an overview of the Rake finger process in the case of Channel Mode 1.

In this mode ces are interpolated values between the current and the previous Sp values entering the channel estimator. So ces changes at chip rate. See FIG. 21.

Figure 22:
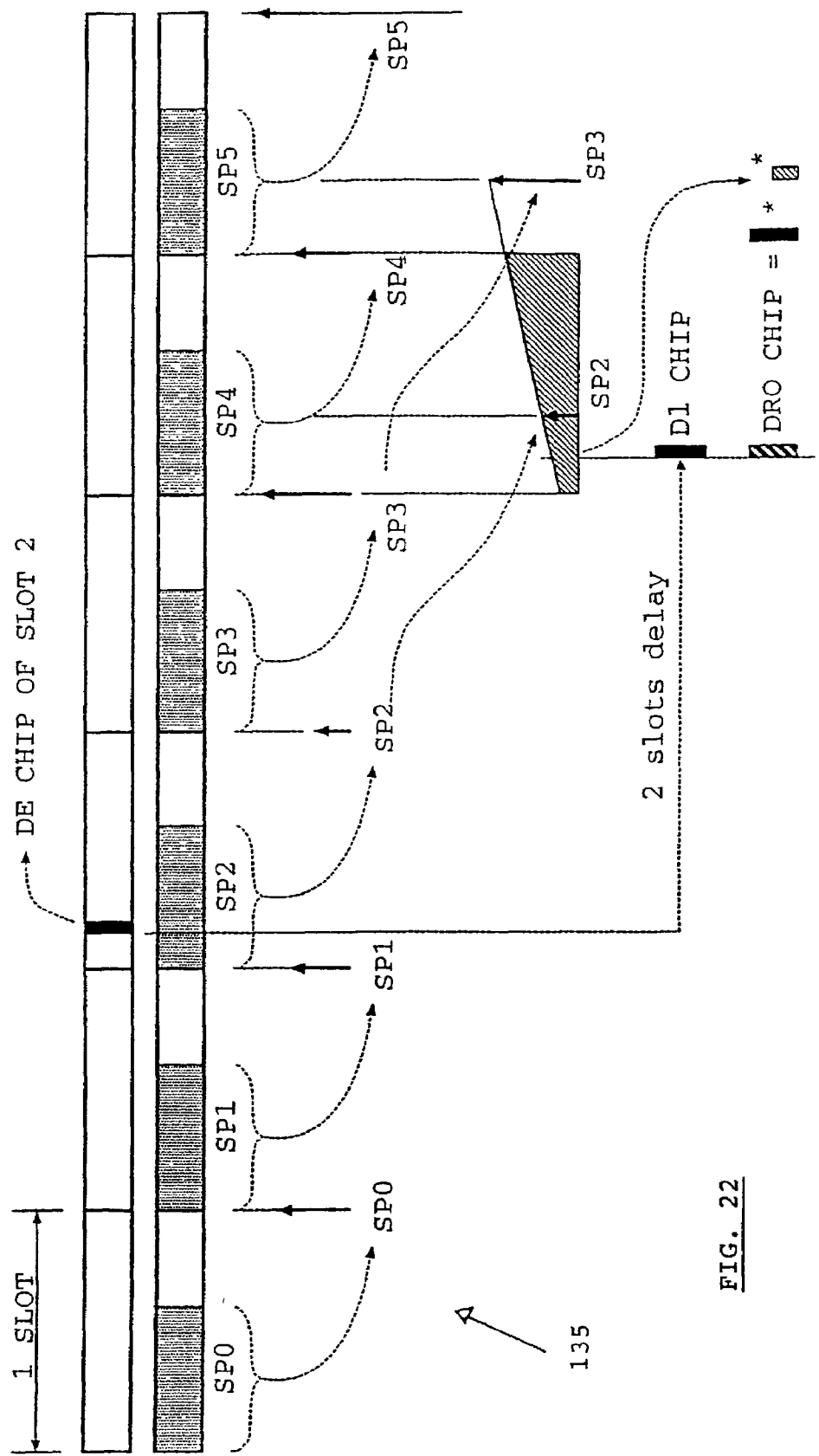

The incoming Sp values are positioned in the middle of the pilot portion to calculate the other complex values. The pipo (pilot position) input is used for this. It is an integer in the range [0:2559]. In FIG. 22, pipo would be 768 or 769 (3/5*2560/2).

Linear interpolation is performed on both real and imaginary part of the Sp values. In this way we go via a straight line in the complex plane from Sp(k−1) to Sp(k).

$$Re[ces(i)]=(Re[Sp(k)]-Re[Sp(k-1)])*(i-pi\_po)/2560+Re[Sp(k-1)]$$

$$Im[ces(i)]=(Im[Sp(k)]-Im[Sp(k-1)])*(i-pi\_po)/2560+Im[Sp(k-1)]$$

with i=0, 1, 2, . . . 2559 The 2560 different chips in a slot.

See FIG. 22 for an overview of the Rake finger process 135 in case of channel mode 1.

The different pilot symbols are demodulated and coherently accumulated giving the values Sp0 to Sp5. The channel estimations ces(i) for the chips i of slot 2 are calculated during slot 4 with the aid of Sp2 and Sp3.

So the Present and Future slot is used to make the channel estimates.

Channel Correction 128 (FIG. 16)

This block has as input the delayed chips D1 coming from the FIFO and the channel estimations per chip ces.

The function of this block is to correct for the channel phase of the finger and give a weight to the finger. The outputs from the different fingers can then be combined (coherently) in one signal.

The following action is performed in these blocks:

$$Dro=D1*ces(*) \text{ with } ces(*) \text{ the complex conjugates of } ces.$$

Zero Forcing 126 (FIG. 16)

Each finger output can be forced to zero with the zf signal.

The purpose of this is to set a finger to 0 when no (or very little) signal is present in that finger to avoid the accumulation of a lot of noise.

The zf signal is obtained by comparing the slotwise FN and a programmable threshold. zf is 1 if FN<=threshold.

Figure 23:
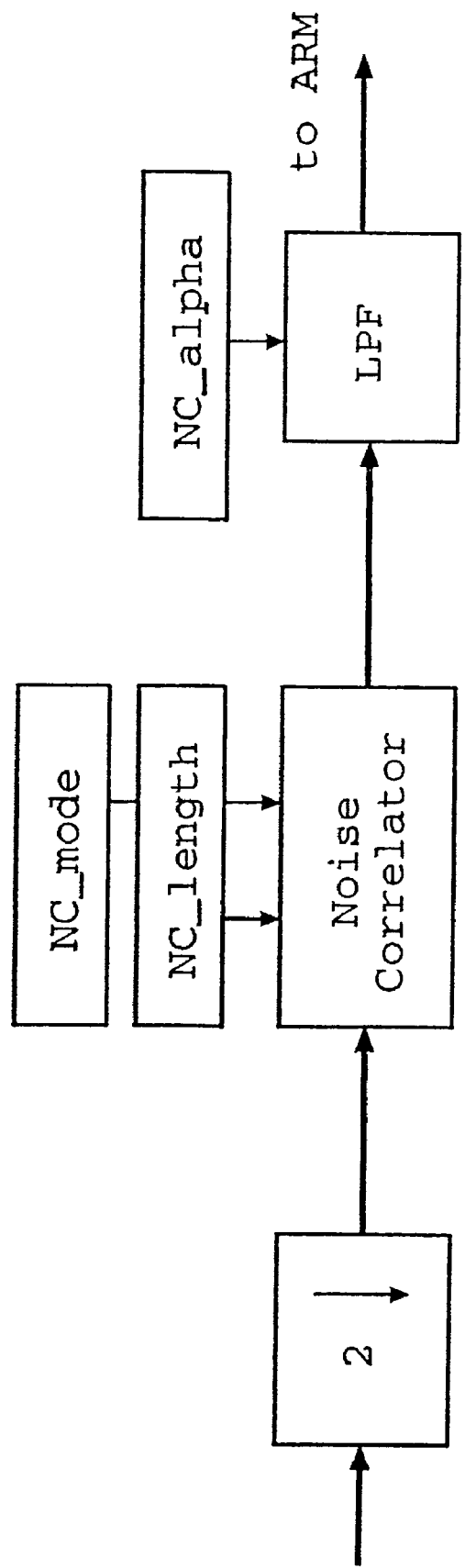
FIG. 23 illustrates the noise estimator.

Noise Estimator (FIG. 23)

The purpose of this block is to get an estimate of the noise power before the despreaders. The block is present on despreaders 0 of tracking unit R input, so at the output of the descrambler.

The N estimator calculates:

$$\sum_{i=0}^{RR.NC.LEN.} (c_i^2 + c_q^2)$$

with $c_i$, $c_q$ the real and complex input of the despreader. The noise power is then the output of this block divided by RR._NC_LEN.+1.

Figure 24:
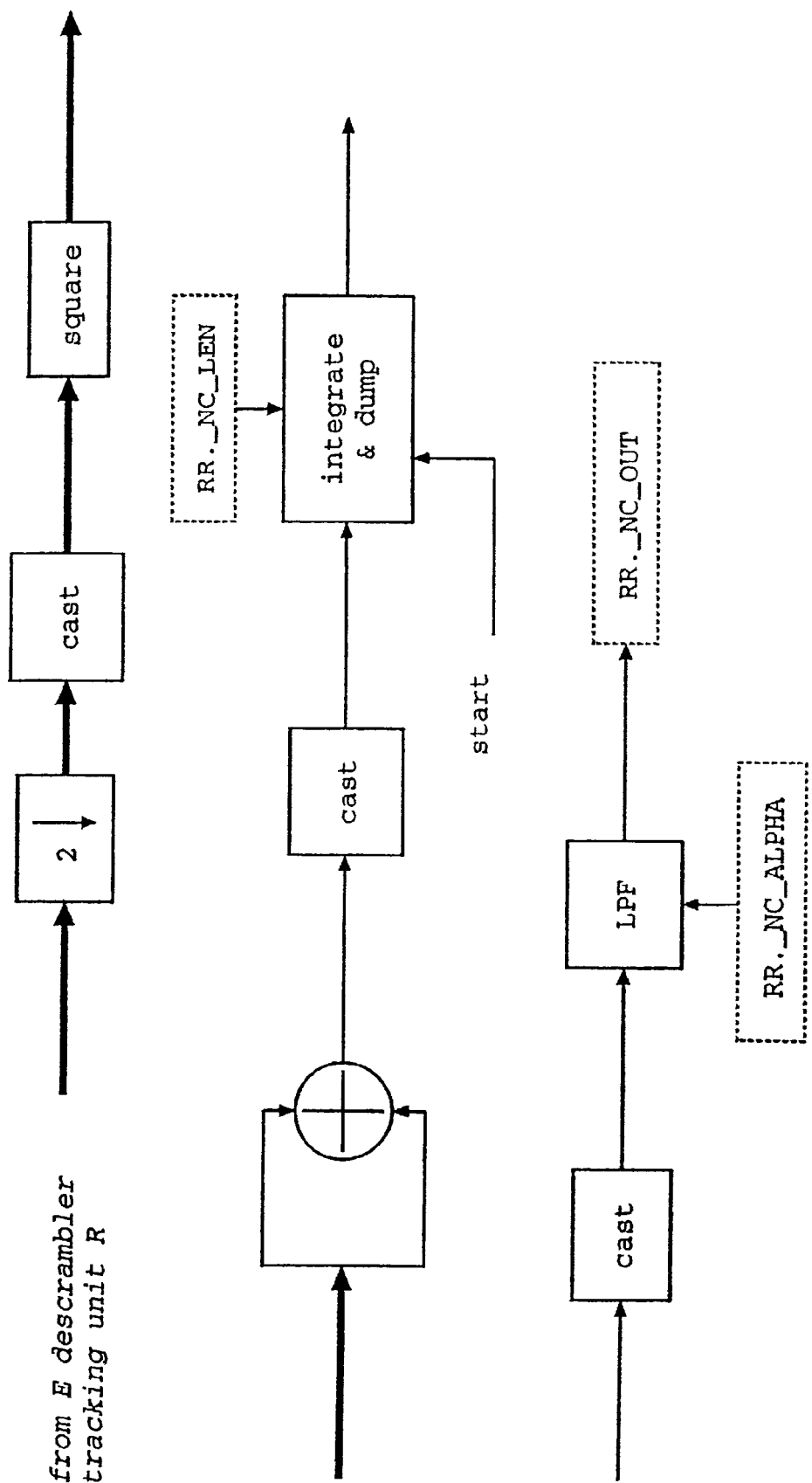
FIG. 24 represents the noise estimator's functional structure.

The functional structure is shown in FIG. 24.

Then these numbers are filtered by a low-pass filter:

$$filter\_out=(1-\alpha)*filter\_in+\alpha*filter\_out*z^{-1}$$

By setting alpha to 0, the filter is bypassed.

RR_NC_ALPHA is a <6,6> number.

The output of the filter goes to the register RR_NC_OUT.

With the start signal the integration can be restarted at any moment.

Figure 25:
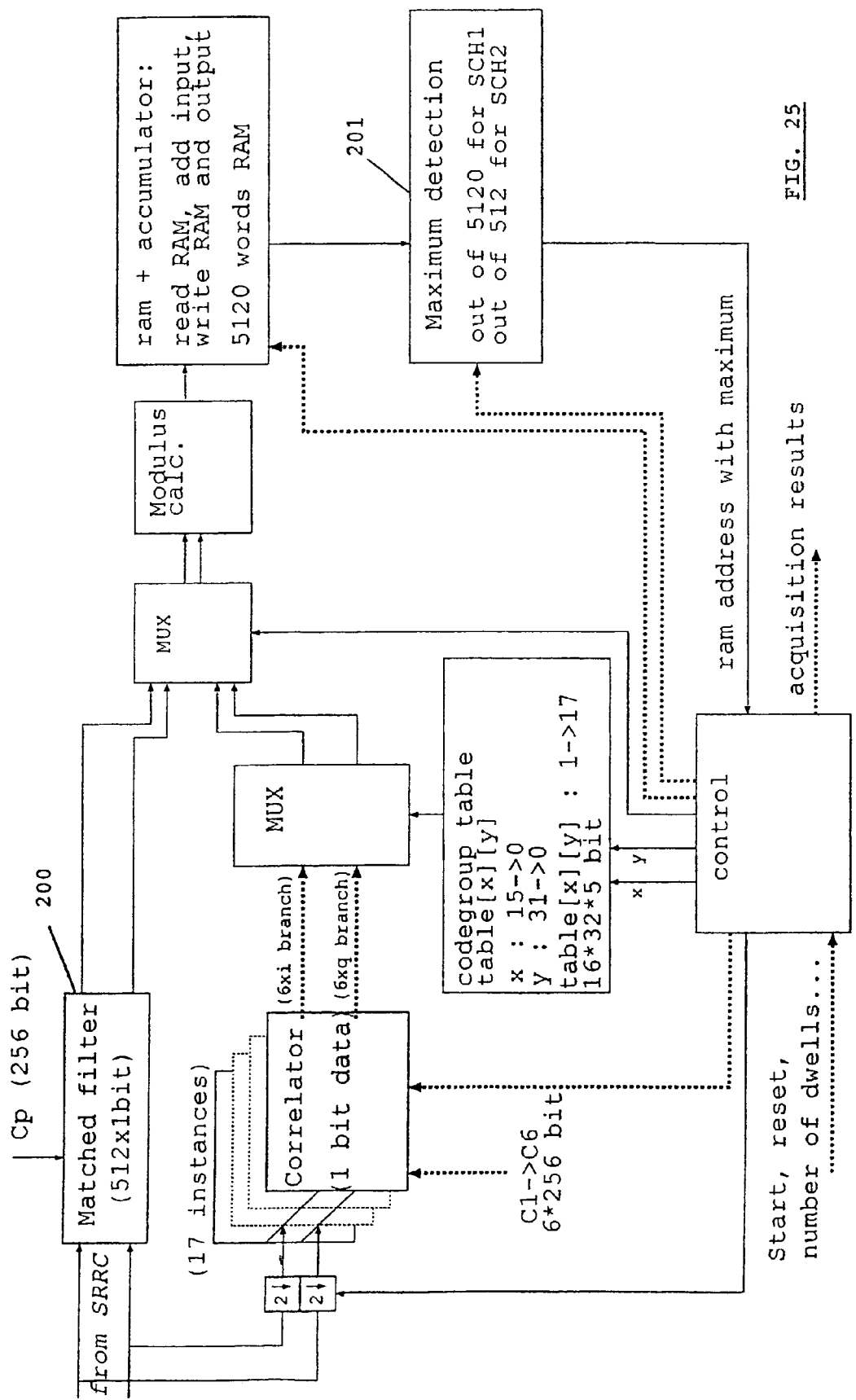
FIG. 25 illustrates the SCH RX hardware.

SCH RX Hardware (FIG. 25)

3 modes are possible: initial cell search, idle mode cell search and active mode cell search.

Initial Cell Search

Figure 26:
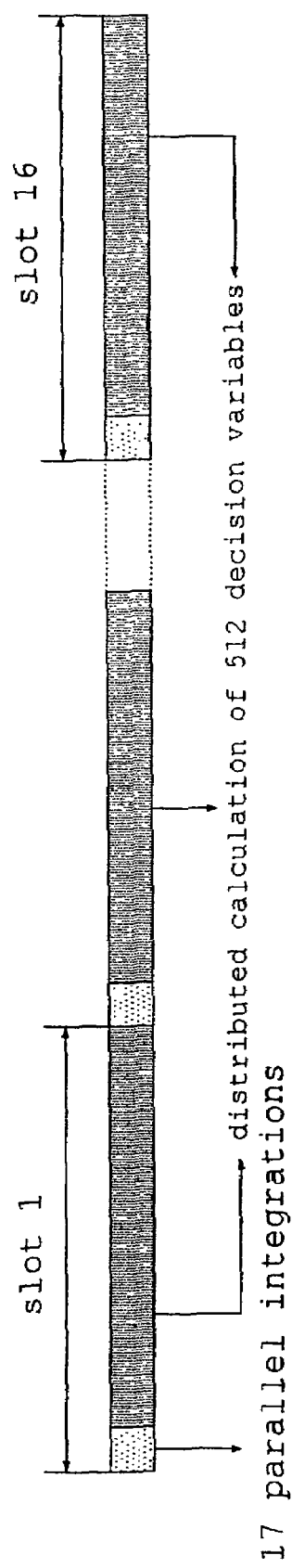
FIG. 26 represents the slot synchronization.

Steps 1 and 2 of the Initial Cell Search are discussed here:

Step 1: Slot Synchronisation (FIG. 26)

In this step, the MS acquires slot synchronisation by doing a fast acquisition on Cp which is common to all Bss.

The samples coming from the SRRC filter and at 2 fchip are sent through a matched filter 200 with the Cp code.

The first 5120 moduli are written into the RAM. To get better reliability a non-coherent dwell is performed. This is done by adding the next 5120 points to the previous 5120 points already present in the RAM. This is repeated for the required number of dwells.

During the last dwell, the maximum detection module 201 finds the maximum in the last 5120 points written to the RAM, and returns the address of this value. This address identifies the slot edge. The correlators can be switched off during this stage.

Step 2: Frame Synchronization and Code-Group Identification

Each BS belongs to 1 of 32 possible codegroups. Each codegroup uses a different sequence of 16 Cs codes on SCH2. From step1 the position of the secondary codes is known. The decision variables are obtained by non-coherently summing the correlator outputs corresponding to each 16 length sequence out of the 32 possible sequences and its 16 cyclic shifts. One decision variable is formed by adding 16 correlator outputs non-coherently (modulus). The calculation of these 512 values is distributed over the 16 idle intervals (9/10) after each correlation.

By generating the correct x and y (x=phaseshift, y=codegroup number) one of the 6 correlator outputs can be selected and the modulus is calculated. During the first slot, in the idle period, each of the codegroup table entries is selected, this selects 1 of the 6 correlator outputs and the modulus of these are written to one of the 512 used RAM positions during step2. During slot n° 2, each value in the RAM is added with 1 of the 6 correlator modulus outputs of slot2. Which correlator needs to be selected for each RAM address is selected by the x and y combination. This is repeated for the 16 slots, during slot n° 16 the resulting values are the 512 decision variables which are sent through the maximum detector.

The address coming from the maximum detection block identifies the codegroup and the phase shift. The frame edge can be determined from the shift.

At least 16 slots have to be added non-coherently.

Figure 27:
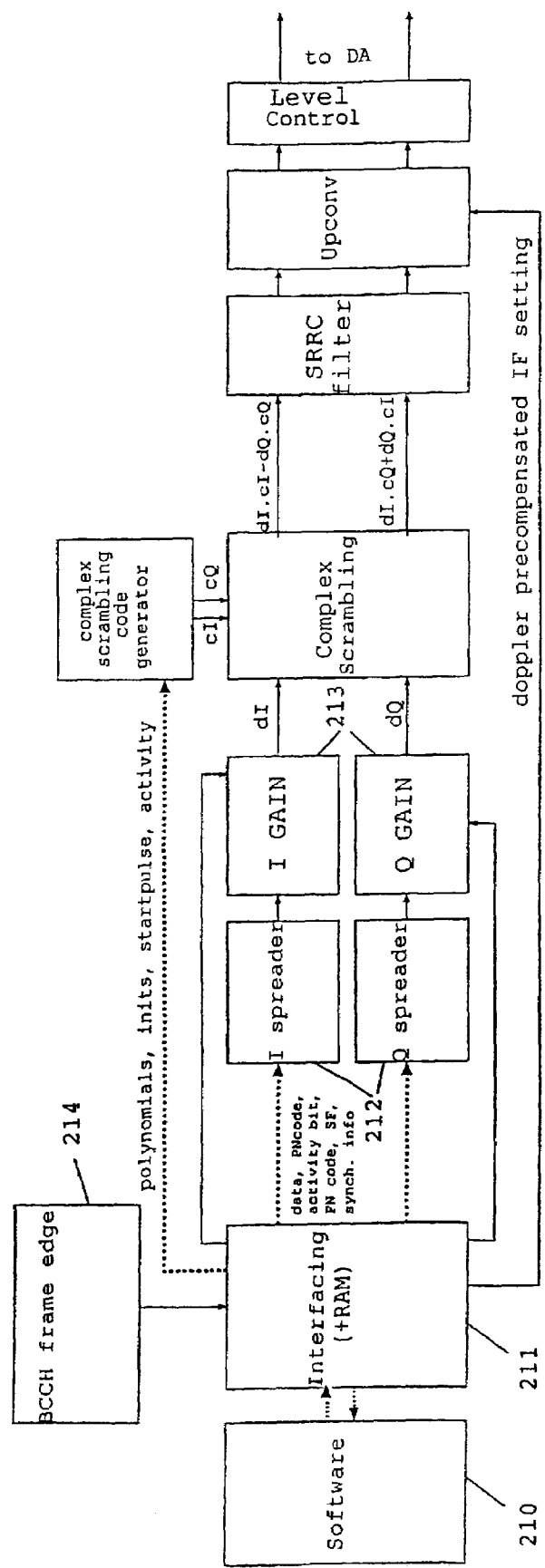
FIG. 27 represents the PRACH TX hardware.

PRACH TX Hardware (FIG. 27)

One of the general TX channels is used to make the PRACH waveform. In that case the following things are required for the general TX channels:

An exact and easy way to work in burst mode (eg the use of an activity bit)

The possibility to 'switch off' and 'switch on' the scramblers at an exact defined time. When the scramblers are turned off, the data must still get the same delay as when the scramblers are turned on.

An important requirement is that it must be possible to synchronise the PRACH with the received BCCH frame edge+an offset of (access_slot_nr−1)*1.25 ms.

Software and Interfacing:

The MS acquires synchronisation to a BS (SCH channel) and reads different parameters from the BCCH channel (preamble spreading codes, available signatures, available access slots, . . . ). The software 210 decides which parameters to use, these parameters are passed to the hardware via the interface block 211. The start of the access slot offset must be synchronous with the BCCH frame edge 214.

The upconverter must be set to a Doppler precompensated IF in order to avoid big integration losses in the BS receiver.

Spreaders (212):

The data coming from the interface block is spread with a max SF of 256. For the access slot offset and the idle period, the activity bit is set to 0. For each of the two branches 256 bit RAM is needed to store the PN codes.

Gain Stage

The spread data is sent through a gain block 213. A different gain must be possible for I and Q branch.

What is claimed is:

1. A communication device for W-CDMA signal transmission and reception, which is software configurable, comprising:
    a W-CDMA transmitter comprising at least one of a RAM and registers;
    a W-CDMA receiver comprising at least one of a RAM and registers;
    a signal acquisition circuit; and
    a digital circuit for phase unbalance precompensation in said W-CDMA transmitter, wherein said digital circuit substantially removes the I, Q phase difference that causes the phases to not have a 90 degree separation,
    wherein the receiver comprises:
    a pulse shaping filter;
    an level control block;
    a demodulator assigned to track multi-path components received from one base station; and
    a reference demodulator for S/(N+1) measurements,
    wherein the level control block comprises:
    a programmable shifter to perform coarse grain dynamic control;
    a programmable multiplier to perform fine grain dynamic control;
    an overflow counter operating on a most significant bit and a second most significant bit; and
    a saturation logic to clip a result from the multiplier.

2. The communication device of claim 1, further comprising a circuit for noise and interference estimation, said circuit comprising:
    means to acquire a programmable number of absolute value accumulations at a chip rate or an oversampled chip rate; and
    a programmable low pass filter to average the noise and interference estimations.

3. The communication device of claim 1, further comprising a circuit for initial synchronization, said circuit comprising:
    a matched filter, energy calculation and accumulating RAM for slot synchronization;
    a set of correlators for frame synchronization and code group identification;
    an energy estimation block; and
    maximum detection means readable by a microprocessor subsystem.

4. The communication device of claim 3, wherein the communication device is configured for at least one of waveform transmission, reception and acquisition of signals selected from the group consisting of UMTS, Satellite UMTS, Galileo, GPS, IS-2000, IMT-2000, CDMA2000, IS-95, 3GPP, 3GPP2 and ARIB signals.

5. The communication device of claim 1, further comprising circuitry to generate packet data transmission, said circuitry comprising:
    a buffer storing data and activity bits;
    I, Q spreaders and gain control means; scrambling code generator and scrambling means; and
    means for packet timing through RX frame edge triggering.

6. The communication device of claim 5, wherein the communication device is configured for RACH transmission in UMTS/FDD.

7. The communication device of claim 1, further comprising a processor.

8. The communication device of claim 7, wherein the processor is configured to reconfigure the communication device.

9. The communication device of claim 7, wherein the processor controls at least one of the RAM registers of said W-CDMA signal transmitter and receiver.

10. The communication device of claim 7, wherein the transmitter comprises a first programmable pulse shaping filter, and wherein the receiver comprises a second programmable pulse shaping filter.

11. The communication device of claim 10, wherein the pulse shaping filters are programmable to perform GMSK filtering, and wherein said transmitter and receiver are arranged to interface with a GSM front-end.

12. The communication device of claim 11, wherein the processor performs a GSM protocol stack.

13. The communication device of claim 1, wherein said transmitter comprises one or more elements selected from the group consisting of:
    synchronization hardware to slave transmit start epochs to events external to the transmitter;
    a burst generator for realizing discontinuous transmissions;
    a QPN channel containing one or more spreaders with their own amplification of the output;
    a combiner to accumulate the QPN channel output;
    a PN code generator;
    a scrambling code generator;
    a scrambler;
    a combiner which accumulates the scrambling code output;
    a pulse shaping oversampling filter; and
    an NCO and upconverter for carrier precompensation.

14. The communication device of claim 13, wherein the PN code generator is realized as a RAM in which PN codes are downloaded under control of the processor.

15. The communication device of claim 13, wherein the scrambling code generator is realized as a programmable Gold Code generator.

16. The communication device of claim 13, wherein the QPN channel is arranged to execute UMTS forward or return link transmission.

17. The communication device of claim 13, wherein an amplification of the spreader output is arranged to perform transmit power control.

18. The communication device of claim 1, wherein the transmitter comprises a time interpolator to perform sub-chip time alignments.

19. The communication device of claim 1, wherein the transmitter is arranged for multi-code transmission.

20. The communication device of claim 1, wherein said receiver further comprises a downconverter prior to said pulse shaping filter in order to interface at a front-end at an intermediate frequency.

21. The communication device of claim 1, wherein the receiver is arranged for execution of at least one of UMTS, Satellite UMTS, Galileo, GPS, IS-2000, IMT-2000, CDMA2000, IS-95, 3GPP, 3GPP2 and ARIB forward link and return link waveforms.

22. The communication device of claim 1, wherein the level control block is operated in a runtime control loop by the processor.

23. The communication device of claim 1, wherein the demodulator comprises:
- a Rake filter producing a signal at a chip rate which is a coherent accumulation of channel corrected multipath components resulting from one base station;
- a tracking unit using said signal at the chip rate for descrambling and despreading a plurality of waveform channels; in which said Rake filter comprises:
- a FIFO to buffer samples at chip rate coming from said level control block;
- a delay line containing a plurality of registers, an input of the delay line being connected to an output of said FIFO;
- a plurality of finger blocks, inputs of said finger blocks being connected to programmable tap positions on said delay line; and
- a summator of complex outputs of said finger blocks at chip rate.

24. The communication device of claim 23, wherein the finger blocks are respectively grouped in a late multipath group and an early multipath group, the Rake filter being arranged to accumulate the energies of the outputs of said late multipath group and said early multipath group, and to use these accumulated values to feed the time error detector of the DLL for time tracking.

25. The communication device of claim 23, wherein the Rake filter comprises memories to hold at least one of a spreading code for a channel correction Pilot, a scrambling code for a channel correction Pilot, a channel correction Pilot symbol modulation, and a channel correction Pilot symbol activities.

26. The communication device of claim 25, wherein the memories are controlled by the processor.

27. The communication device of claim 25, wherein the finger block comprises:
- a channel correction Pilot descrambler;
- a channel correction Pilot despreader;
- a channel correction Pilot filter, first performing a coherent channel correction Pilot symbol accumulation over a programmable number of steps, and secondly producing a weighted average on a programmable number of said coherent channel correction Pilot symbol accumulation over a programmable number of steps;
- a channel estimator generating a channel estimation at chip rate, using outputs of said Pilot filter;
- a channel corrector performing a multiplication of an incoming chip stream with a complex conjugate of said channel estimation;
- a calculation of a slot energy;
- a comparison of the slot energy with a programmable threshold; and
- a circuit to force said channel estimation to zero if said threshold is not exceeded.

28. The communication device of claim 27, wherein the finger is arranged for slow and fast fading compensation, by programming the channel correction Pilot filter for slow fading, said channel correction Pilot filter first performing a coherent accumulation over a slot, and secondly performing a weighted average over previous-previous, previous, actual and next obtained slot values, yielding a channel estimation per slot, which is applied by said channel corrector; and for fast fading, said channel correction Pilot filter first performing a coherent accumulation over a slot, and then deriving channel estimations through interpolating consecutive said coherent accumulations over a slot, yielding channel estimations with sub-symbol timing, which are applied by said channel corrector.

29. The communication device of the claim 1, wherein the reference demodulator comprises:
- an accumulator of programmable length of the absolute values of samples at chip rate; and
- a low pass filter operating on said accumulator output.

30. The communication device of claim 1, wherein the reference demodulator is arranged to operate in a runtime control loop by the processor.

31. The communication device of claim 1, wherein the demodulator is arranged to perform satellite diversity.

32. The communication device of claim 1, wherein the communication device is configured to perform accurate ranging measurements to geostationary satellites.

33. The communication device of claim 1, wherein the digital circuit performs arithmetic calculations to substantially remove the I, Q phase difference, the calculations comprising:

$$Iout+Iin+Qin*tan(B), \text{ and}$$

$$Qout+Qin+Iin*tan(B),$$

where a compensation angle is 2B.

34. The communication device of claim 1, wherein the digital circuit uses a software configurable compensation angle.

35. The communication device of claim 1, wherein the digital circuit comprises:
- an input register holding a compensation angle; and
- a section adapted to perform arithmetic calculations to acquire a change of the I, Q angle by the compensation angle.

36. A communication device for W-CDMA signal transmission and reception, which is software configurable, comprising:
- a W-CDMA transmitter comprising at least one of a RAM and registers;
- a W-CDMA receiver comprising at least one of a RAM and registers;
- a signal acquisition circuit;
- a digital circuit for phase unbalance precompensation comprised in said W-CDMA transmitter, said digital circuit comprising:
- an input register holding a compensation angle; and
- a section adapted to perform arithmetic calculations to acquire a change of an I, Q angle by the compensation angle;
- wherein the W-CDMA receiver comprises a level block control, the level block control comprising:
- a programmable shifter to perform coarse grain dynamic control;
- a programmable multiplier to perform fine grain dynamic control;
- an overflow counter operating on a most significant bit and a second most significant bit; and
- a saturation logic to clip a result from the multiplier.

37. A communication device for W-CDMA signal transmission and reception, which is software configurable, comprising:
- a W-CDMA transmitter comprising at least one of a RAM and registers;
- a W-CDMA receiver comprising at least one of a RAM and registers;
- a signal acquisition circuit;
- a digital circuit for phase unbalance precompensation comprised in said W-CDMA transmitter, said digital circuit comprising:
- an input register holding a compensation angle; and
- a section adapted to perform arithmetic calculations to acquire a change of an I, Q angle by the compensation angle;
- wherein the W-CDMA receiver comprises a demodulator assigned to track multi-path components received from one base station, wherein the demodulator comprises:
- a Rake filter producing a signal at a chip rate which is a coherent accumulation of channel corrected multipath components resulting from one base station;
- a tracking unit using said signal at the chip rate for descrambling and despreading a plurality of waveform channels; in which said Rake filter comprises:
- a FIFO to buffer samples at chip rate coming from said level control block;
- a delay line containing a plurality of registers, an input of the delay line being connected to an output of said FIFO;
- a plurality of finger blocks, inputs of said finger blocks being connected to programmable tap positions on said delay line; and
- a summator of complex outputs of said finger blocks at chip rate.

38. The communication device of claim 37, wherein the finger blocks are respectively grouped in a late multipath group and an early multipath group, the Rake filter being arranged to accumulate the energies of the outputs of said late multipath group and said early multipath group, and to use these accumulated values to feed the time error detector of the DLL for time tracking.

39. The communication device of claim 37, wherein the Rake filter comprises memories to hold at least one of a spreading code for a channel correction Pilot, a scrambling code for a channel correction Pilot, a channel correction Pilot symbol modulation, and a channel correction Pilot symbol activities.

40. The communication device of claim 39, wherein the memories are controlled by the processor.

41. The communication device of claim 39, wherein the finger block comprises:
- a channel correction Pilot descrambler;
- a channel correction Pilot despreader;
- a channel correction Pilot filter, first performing a coherent channel correction Pilot symbol accumulation over a programmable number of steps, and secondly producing a weighted average on a programmable number of said coherent channel correction Pilot symbol accumulation over a programmable number of-steps;
- a channel estimator generating a channel estimation at chip rate, using outputs of said Pilot filter;
- a channel corrector performing a multiplication of an incoming chip stream with a complex conjugate of said channel estimation;
- a calculation of a slot energy;
- a comparison of the slot energy with a programmable threshold; and
- a circuit to force said channel estimation to zero if said threshold is not exceeded.

42. The communication device of claim 41, wherein the finger is arranged for slow and fast fading compensation, by programming the channel correction Pilot filter for slow fading, said channel correction Pilot filter first performing a coherent accumulation over a slot, and secondly performing a weighted average over previous, previous, previous, actual and next obtained slot values, yielding a channel estimation per slot, which is applied by said channel corrector; and for fast fading, said channel correction Pilot filter first performing a coherent accumulation over a slot, and then deriving channel estimations through interpolating consecutive said coherent accumulations over a slot, yielding channel estimations with sub-symbol timing, which are applied by said channel corrector.

* * * * *